(12) United States Patent
Arai et al.

(10) Patent No.: US 11,201,898 B2
(45) Date of Patent: Dec. 14, 2021

(54) SIP PROXY SERVER, COMMUNICATION METHOD AND SIP PROXY PROGRAM

(71) Applicant: Nippon Telegraph and Telephone Corporation, Tokyo (JP)

(72) Inventors: Kenjiro Arai, Tokyo (JP); Muneaki Ogawa, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/045,859

(22) PCT Filed: Apr. 9, 2019

(86) PCT No.: PCT/JP2019/015369
§ 371 (c)(1),
(2) Date: Oct. 7, 2020

(87) PCT Pub. No.: WO2019/198682
PCT Pub. Date: Oct. 17, 2019

(65) Prior Publication Data
US 2021/0075831 A1    Mar. 11, 2021

(30) Foreign Application Priority Data
Apr. 12, 2018 (JP) .............................. JP2018-077099

(51) Int. Cl.
*G06F 15/16* (2006.01)
*H04L 29/06* (2006.01)
*H04L 29/08* (2006.01)

(52) U.S. Cl.
CPC ........ *H04L 65/1006* (2013.01); *H04L 65/105* (2013.01); *H04L 67/141* (2013.01); *H04L 67/42* (2013.01)

(58) Field of Classification Search
CPC . H04L 65/1006; H04L 65/105; H04L 67/141; H04L 67/42; H04W 4/16
(Continued)

(56) References Cited

U.S. PATENT DOCUMENTS 7,408,925 B1* 8/2008 Boyle ................... H04M 7/006
370/352
10,193,938 B2* 1/2019 Al-Damluji ........... H04L 65/608
(Continued)

OTHER PUBLICATIONS

[No Author Listed], "3rd Generation Partnership Project; Technical Specification Group Core Network and Terminals; IP Multimedia Subsystem (IMS) Customized Alerting Tones (CAT); Protocol specification (Release 14)," 3GPP A Global Initiative, Dec. 2017, 144 pages.
(Continued)

*Primary Examiner* — Razu A Miah
(74) *Attorney, Agent, or Firm* — Fish & Richardson P.C.

(57) ABSTRACT

An SIP proxy server 1 includes a forking termination unit 21. The forking termination unit 21 is configured to: in response to receiving an Initial INVITE request message from a originating-side network 6, transmit the Initial INVITE request message to an incoming-side network 7, and in response to receiving an 18X response message at the first time from the incoming-side network, transmit the 18X response message received at the first time to the originating-side network 6. The forking termination unit 21 establishes Early dialog #0 between the SIP proxy server and the originating-side network 6 and establishes Early Dialog #1 that is compatible with an incoming-side terminal 3 that is a transmission source of an 18X response message received at the first time. In response to receiving 18X response message at the second time from the incoming-side network 7, the forking termination unit 21 establishes Early Dialog
(Continued)

2 that is compatible with the incoming-side terminal 3 that is a transmission source of the 18X response message received at the second time.

18 Claims, 15 Drawing Sheets

(58) Field of Classification Search
 USPC .......................................................... 709/227
 See application file for complete search history.

(56) References Cited

U.S. PATENT DOCUMENTS

| | | | | |
|---|---|---|---|---|
| 10,397,285 B2* | 8/2019 | Sarashiya | ............... | H04L 69/24 |
| 2007/0043872 A1* | 2/2007 | Pattan | ................ | H04L 65/1043 |
| | | | | 709/227 |
| 2007/0206620 A1* | 9/2007 | Cortes | .................... | H04L 47/58 |
| | | | | 370/412 |
| 2008/0046573 A1* | 2/2008 | Ropolyi | ............. | H04L 65/1016 |
| | | | | 709/227 |
| 2008/0240375 A1* | 10/2008 | Chen | ................ | H04L 29/06027 |
| | | | | 379/87 |
| 2009/0013078 A1* | 1/2009 | Bencheikh | ............. | H04L 65/80 |
| | | | | 709/227 |
| 2009/0164639 A1* | 6/2009 | Sylvain | ................ | H04L 65/105 |
| | | | | 709/227 |
| 2009/0204713 A1* | 8/2009 | Beziot | ................ | H04L 65/1016 |
| | | | | 709/228 |
| 2010/0217837 A1* | 8/2010 | Ansari | ................... | G06Q 30/04 |
| | | | | 709/218 |
| 2011/0116492 A1* | 5/2011 | Byron | ................. | H04L 65/1063 |
| | | | | 370/352 |
| 2012/0042083 A1* | 2/2012 | Ghazanfar | .............. | H04W 4/08 |
| | | | | 709/227 |
| 2012/0131114 A1* | 5/2012 | Lu | ........................... | H04L 51/36 |
| | | | | 709/206 |
| 2012/0166656 A1* | 6/2012 | Asveren | .............. | H04L 65/1076 |
| | | | | 709/228 |
| 2012/0284414 A1* | 11/2012 | Noldus | ............... | H04L 65/1006 |
| | | | | 709/227 |
| 2013/0212166 A1* | 8/2013 | Willig | ................. | H04L 65/1069 |
| | | | | 709/203 |
| 2013/0212298 A1* | 8/2013 | Bunch | ................... | H04L 65/105 |
| | | | | 709/244 |
| 2015/0032863 A1* | 1/2015 | Sinha | .................. | H04L 65/1073 |
| | | | | 709/220 |
| 2015/0039773 A1* | 2/2015 | Runeson | ............. | H04L 65/1073 |
| | | | | 709/227 |
| 2015/0116450 A1* | 4/2015 | Li | .......................... | H04N 7/147 |
| | | | | 348/14.12 |
| 2015/0120947 A1* | 4/2015 | Guo | ....................... | H04L 67/143 |
| | | | | 709/228 |
| 2016/0227029 A1* | 8/2016 | Wolfeld | ................. | H04M 3/12 |
| 2017/0041752 A1* | 2/2017 | Baek | .................... | H04W 4/023 |
| 2019/0037518 A1* | 1/2019 | Russell | ................... | H04W 8/24 |

OTHER PUBLICATIONS

Rosenberg et al., "SIP: Session Initiation Protocol," Network Working Group, Jun. 2002, 270 pages.

* cited by examiner

SIP PROXY SERVER, COMMUNICATION METHOD AND SIP PROXY PROGRAM

CROSS-REFERENCE TO RELATED APPLICATIONS

This application is a National Stage application under 35 U.S.C. § 371 of International Application No. PCT/JP2019/015369, having an International Filing Date of Apr. 9, 2019, which claims priority to Japanese Application Serial No. 2018-077099, filed on Apr. 12, 2018. The disclosure of the prior application is considered part of the disclosure of this application, and is incorporated in its entirety into this application.

TECHNICAL FIELD

The present invention relates to an SIP proxy server connected to a originating-side network to which a forking-non-compatible originating-side terminal belongs and an incoming-side network to which a plurality of forking-compatible incoming-side terminals belong, a communication method, and an SIP proxy program.

BACKGROUND ART

In regard to a calling control procedure using a session initiation protocol (SIP), a parallel forking function (hereinafter referred to as "forking") is defined in Request for Comments (RFC) 3261 (Non-Patent Literature 1). Forking is a function of transmitting an INVITE request received from a originating-side terminal to a plurality of SIP apparatuses or SIP terminals. Forking is used as a function of calling terminals of a subscriber who owns one phone number/a plurality of terminals at the same time and a function for transmitting an early medium such as Ring Back Tone (RBT) from a network to the originating-side terminal (a forking model defined in 3GPP TS 24.182 (Non-Patent Literature 2)).

According to section 13.2.2.4 in RFC3261, a user agent client (UAC) that is an INVITE transmission source stipulates, as a required function, reception of SIP responses (hereinafter, referred to as a "forking response") of different dialogs generated by forking of an SIP request. Specifically, in response to receiving responses of different SIP dialogs for a single transmission INVITE request, an SIP server manages the plurality of SIP dialogs. Also, the SIP server is required to have a function of starting, in response to receiving a 200OK response for the INVITE request, transmitting an ACK request, talking in a corresponding dialog, and in response to receiving a 200OK response in another dialog transmitting an ACK request, causing disconnection with a BYE request.

A forking response receiving function requires an instantaneous C-plane resource because it is necessary to manage a plurality of SIP dialogs until a 200OK for the INVITE request is received for one call, and band control for each medium becomes more complex. Therefore, although the forking response receiving function is a required function on RFC3261, there are many implemented networks or terminals that simplify the implementation by discarding, in response to receiving the 18X response, the 18X response, for which a to-tag that is different from that for an established dialog is set, and giving up talking midway or transmitting a CANCEL request/BYE request.

Also, networks and communication terminals that are compatible with forking and networks and communication terminals that are not compatible with forking are present together in the current situation.

CITATION LIST

Non Patent Literature

Non-Patent Literature 1: Network Working Group, "RFC3261 SIP: Session Initiation Protocol", June 2002, 3GPP, [retrieved on Apr. 10, 2018], Internet <https://tools.ietf.org/html/rfc3261>Non-Patent Literature 2: 3rd Generation Partnership Project; Technical Specification Group Core
Network and Terminals, "3GPP TS24.182 V14.1.0 IP Multimedia Subsystem (IMS) Customized Alerting Tones (CAT); Protocol Specification (Release 14)", Dec. 28, 2017, 3GPP, [retrieved on Apr. 10, 2018], Internet <https://portal.3gpp.org/desktopmodules/Specifications/SpecificationDetails.aspx?specificationId=1050>

SUMMARY OF THE INVENTION

Technical Problem

Because the networks and the communication terminals that are not compatible with forking cannot process the forking function, it is difficult to mutually connect to the networks and the communication terminals that are compatible with forking. It is possible to normally connect to each other by changing the networks and the communication terminals that are not compatible with forking into networks and communication terminals that are compatible with forking. However, it is not practical to change all the networks and communication terminals to ones that are forking-compatible in a situation in which it is difficult to modify existing networks and communication terminals.

Therefore, an object of the present invention is to provide an SIP proxy server, a communication method, and an SIP proxy program that interconnect networks and communication terminals that are not compatible with forking with networks and communication terminals that are compatible with forking.

Means for Solving the Problem

In order to solve the aforementioned problems, a first feature of the present invention relates to an SIP proxy server that connects a originating-side network to which a forking-non-compatible originating-side terminal belongs to an incoming-side network to which a plurality of forking-compatible incoming-side terminals belong. An SIP proxy server according to the first feature of the present invention includes: a forking termination unit configured to: in response to receiving an Initial INVITE request message from the originating-side network, transmit the Initial INVITE request message to the incoming-side network, in response to receiving an 18X response message at the first time from the incoming-side network, in a case in which the 18X response message received at the first time includes SDP answer data, transmit the 18X response message including the SDP answer data to the originating-side network, and in a case in which the 18X response message received at the first time does not include SDP answer data, transmit the 18X response message to the originating-side network, establish a originating-side early dialog with the originating-side network and establish a first incoming-side early dialog corresponding to an incoming-side terminal that is a transmission source of the 18X response message received at the first time, and in response to receiving an 18X response message at the second time from the incoming-side network, establish a second incoming-side early dialog corresponding to an incoming-side terminal that is a transmission source of the 18X response message received at the second time.

In response to receiving an 18X response message including SDP answer data from the incoming-side network in a state where no SDP answer data has been returned yet to the originating-side network, the forking termination unit may transmit an 18X response message including the SDP answer data included in the received 18X response message in the originating-side early dialog.

In response to receiving an 18X response message including a P-Early-Media header and SDP answer data, for which sendrecv or sendonly has been set, from the incoming-side network in a state where SDP answer data has been returned to the originating-side network, the forking termination unit may transmit an UPDATE request message, for which SDP offer data that is the SDP answer data has been set, in the originating-side early dialog.

In response to receiving an 18X response message including a P-Early-Media header and SDP answer data, for which sendrecv or sendonly has not been set, from the incoming-side network in a state where SDP answer data has been returned to the originating-side network, the forking termination unit may associate and store an incoming-side early dialog corresponding to an incoming-side terminal that is a transmission source of the 18X response and the SDP data included in the received 18X response message.

In response to receiving a 200OK response message for an Initial INVITE request message including SDP answer data, the forking termination unit may, in a casein which no SDP answer data has been returned yet to the originating-side network, transmit a 200OK response message for an Initial INVITE request message including the SDP answer data included in the 200OK response message in the originating-side early dialog, and in a case in which SDP answer data has been returned to the originating-side network, compare the SDP answer data included in the 200OK response message with SDP data last transmitted to or received from the originating-side network, and in a case in which there is a difference, generate SDP offer data to be transmitted to the originating-side network from the SDP answer data included in the 200OK response message, transmit the generated SDP offer data an UPDATE request message with the originating-side early dialog, and then transmit a 200OK response message for the Initial INVITE request message with the originating-side early dialog, and in a case in which there is no difference, transmit a 200OK response message for the Initial INVITE request message that does not include SDP data in the originating-side early dialog.

In response to receiving a 200OK response message for an Initial INVITE request message that does not include SDP answer data, the forking termination unit may compare SDP answer data last transmitted or received with SDP data last transmitted to or received from the originating-side network in a dialog in which the 200OK response message has been received, in a case in which there is a difference, generate SDP offer data to be transmitted to the originating-side network from the SDP answer data last transmitted or received in the dialog in which the 200OK response message has been received, transmit an UPDATE request message for which the generated SDP offer data has been set in the originating-side early dialog, and then transmit a 200OK response message for the Initial INVITE request message in the originating-side early dialog, and in a case in which there is no difference, transmit a 200OK response message for the Initial INVITE request message that does not include SDP data in the originating-side early dialog.

A second feature of the present invention relates to a communication method performed by an SIP proxy server connected to a originating-side network to which a forking-non-compatible originating-side terminal belongs and an incoming-side network to which a plurality of forking-compatible incoming-side terminals belong. The communication method according to the second feature of the present invention includes: in response to receiving an Initial INVITE request message from the originating-side network, transmitting, at the SIP proxy server, an Initial INVITE request message to the incoming-side network; in response to receiving an 18X response message at the first time from the incoming-side network, in a case in which the 18X response message received at the first time includes SDP answer data, transmitting, at the SIP proxy server, the 18X response message including the SDP answer data to the originating-side network, and in a case in which the 18X response message received at the first time does not include SDP answer data, transmitting, at the SIP proxy server, the 18X response message to the originating-side network: establishing, at the SIP proxy server, a originating-side early dialog between the SIP proxy server and the originating-side network, and establishing, at the SIP proxy server, a first incoming-side early dialog corresponding to an incoming-side terminal that is a transmission source of the 18X response message received at the first time; and in response to receiving an 18X response message at the second time from the incoming-side network, establishing, at the SIP proxy server, a second incoming-side early dialog corresponding to an incoming-side terminal that is a transmission source of the 18X response message received at the second time.

A third feature of the present invention relates to a SIP proxy program configured to cause a computer to function as the SIP proxy server according to the first feature of the present invention.

Effects of the Invention

According to the present invention, it is possible to provide an SIP proxy server, a communication method, and an SIP proxy program that interconnect networks and communication terminals that are not compatible with forking and networks and communication terminals that are compatible with forking.

DESCRIPTION OF EMBODIMENTS

Next, an embodiment of the present invention will be described with reference to the drawings. In the following description regarding the drawings, the same or similar reference signs will be provided to the same or similar components.

Communication System

Figure 1:
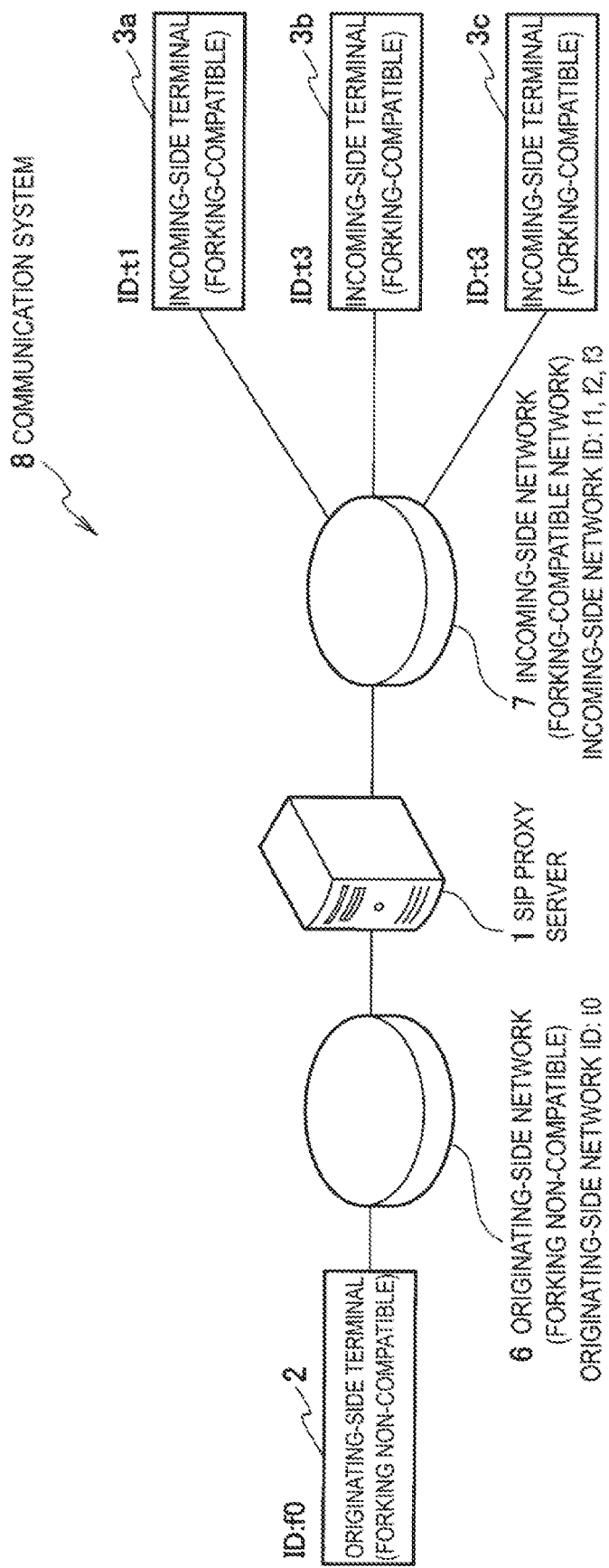
FIG. 1 is a system configuration diagram of a communication system according to an embodiment of the present invention.

Referring to FIG. 1, a communication system 8 in which an SIP proxy server 1 according to the embodiment of the present invention is used will be described. In the communication system 8 illustrated in FIG. 1, a terminal that is not compatible with forking performs transmission to terminals that are compatible with forking.

The communication system 8 includes the SIP proxy server 1, one originating-side terminal 2, a first incoming-side terminal 3a, a second incoming-side terminal 3b and a third incoming-side terminal 3c. In a case in which the first incoming-side terminal 3a, the second incoming-side terminal 3b and the third incoming-side terminal 3c are not particularly distinguished from each other, the first incoming-side terminal 3a, the second incoming-side terminal 3b, and the third incoming-side terminal 3c may simply be referred to as incoming-side terminals 3.

The SIP proxy server 1 is connected to a originating-side network 6 to which the forking-non-compatible originating-side terminal 2 belongs and an incoming-side network 7 to which the plurality of forking-compatible incoming-side terminals 3 belong. The SIP proxy server 1 is an Interconnection Border Control Function (IBCF), for example. The originating-side network 6 is a forking-non-compatible IP Multimedia Subsystem (IMS) network while the incoming-side network 7 is a forking-compatible IMS network, for example.

The originating-side terminal 2 is a terminal that is not compatible with forking. The originating-side terminal 2 is connected to the SIP proxy server 1 via the forking-non-compatible originating-side network 6.

The first incoming-side terminal 3a, the second incoming-side terminal 3b, and the third incoming-side terminal 3c are used by one subscriber, have a common phone number, and are compatible with forking. It is possible to call the three incoming-side terminals 3 by calling this phone number. Although the case in which an incoming-side subscriber owns the three incoming-side terminals 3 will be described in the example illustrated in FIG. 1, the present invention is not limited thereto, and it is only necessary for the subscriber to own two or more incoming-side terminals 3.

Figure 2:
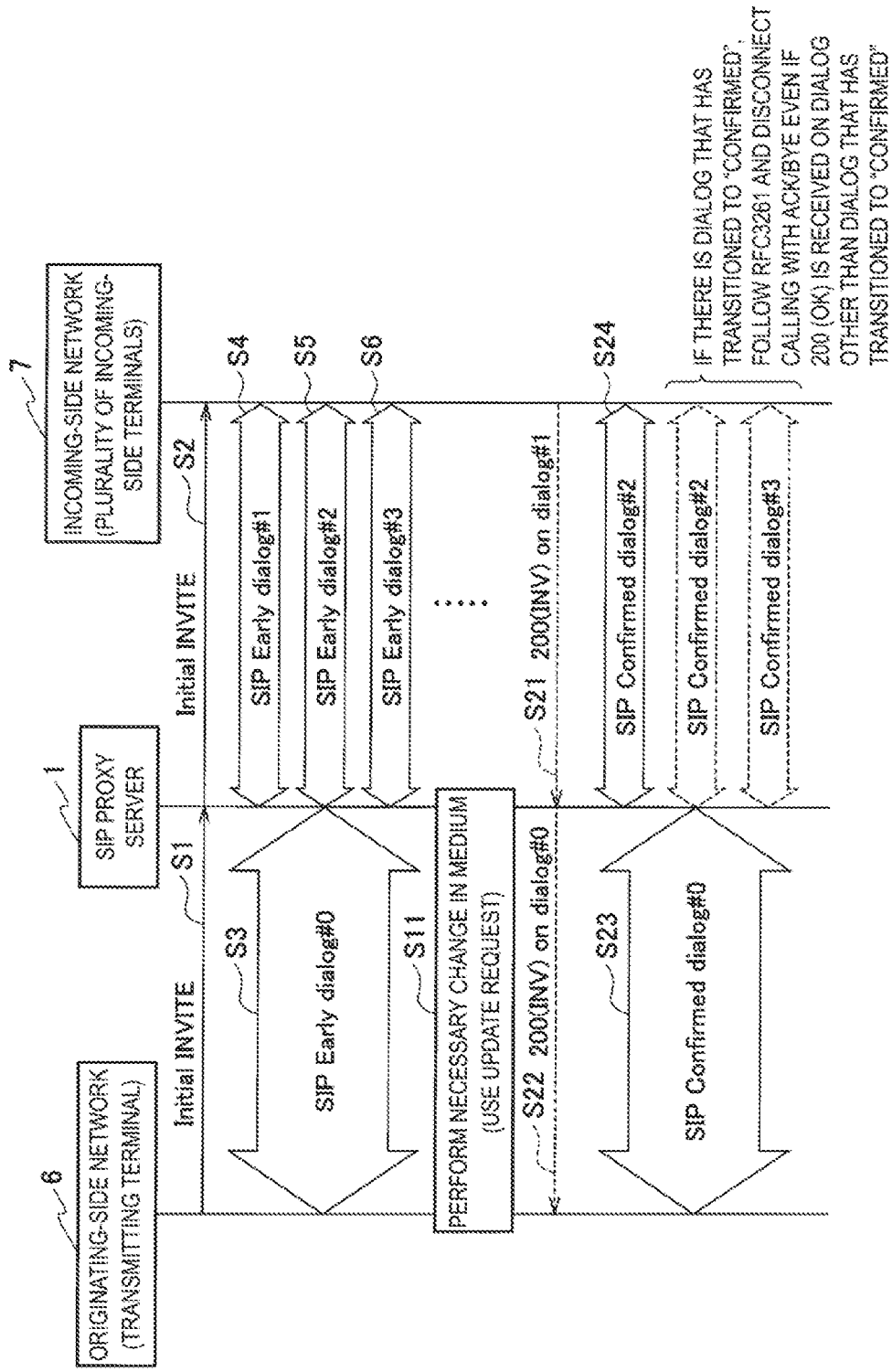
FIG. 2 is a sequence diagram for explaining an outline of a communication method according to the embodiment of the present invention.

An outline of a communication method performed by the communication system 8 according to the embodiment of the present invention will be described with reference to FIG. 2.

In response to receiving an Initial Invite message from the originating-side network 6 in Step S1, the SIP proxy server 1 transmits the Initial Invite message to each of the three incoming-side terminals 3 in the incoming-side network 7 in Step S2.

The SIP proxy server 1 establishes Early dialog #0 between the SIP proxy server 1 and the originating-side network 6 in Step S3 and also establishes Early dialog #1 to Early dialog #3 corresponding to the three incoming-side terminals 3 between the SIP proxy server 1 and the incoming-side network 7 in Steps S4 to S6.

Early dialog #0 is a dialog for connecting a tag fb of the originating-side network 6 to a tag t0 of the SIP proxy server 1. Early dialog #1 is a dialog corresponding to the first incoming-side terminal 3a and connecting a tag f of the SIP proxy server 1 to a tag t1 of the incoming-side network 7. Early dialog #2 is a dialog corresponding to the second incoming-side terminal 3b and connecting a tag 12 of the SIP proxy server 1 to a tag 2 of the incoming-side network 7. Early dialog #3 is a dialog corresponding to the third incoming-side terminal 3c and connecting a tag f3 of the SIP proxy server 1 to a tag 3 of the incoming-side network 7. Note that the SIP proxy server 1 may directly establish an Early dialog with the originating-side terminal 2 or the incoming-side terminals 3 or may establish each Early dialog with a network device corresponding to the originating-side terminal 2 or each incoming-side terminal 3 such as a network device that is in charge of a call session control function (CSCF).

An Initial Invite message is received from the originating-side network 6, and the SIP proxy server 1 transmits and receives a session description protocol (SDP) data using Early dialog #0 to and from the originating-side network 6 and perform a necessary change in medium in Step S1 until a 200OK message for the Initial Invite message is received from the incoming-side network 7.

Here, in response to receiving the 200OK message for the Initial Invite message from Early dialog #1 corresponding to the first incoming-side terminal 3a in Step S21, the SIP proxy server 1 transmits a 200OK message for the Initial Invite message to the originating-side network 6 using Early dialog #0 in Step S22.

Thereafter, Early dialog #0 transitions to Confirmed dialog #0 in Step S23, and Early dialog #1 transitions to Confirmed dialog #1 in Step S24. Note that for Early dialog #2 and Early dialog #3, calling is disconnected with ACK or BYE and Early dialog #2 and Early dialog #3 do not transition to Confirmed dialog.

SIP Proxy Server

Figures 3, 4:
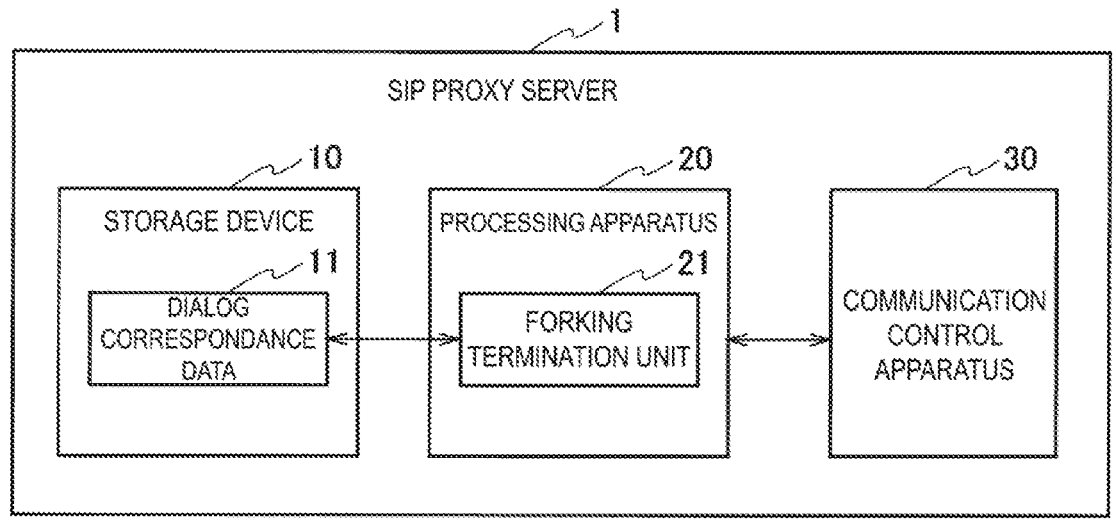
FIG. 3 is a diagram for explaining a hardware configuration and functional blocks of an SIP proxy server according to the embodiment of the present invention.
FIG. 4 is a diagram for explaining an example of a data structure of dialog correspondence data and the data in the SIP proxy server according to the embodiment of the present invention.

Referring to FIG. 3, the SIP proxy server 1 according to the embodiment of the present invention will be described. The SIP proxy server 1 is a typical computer including a storage device 10, a processing apparatus 20, and a communication control apparatus 30. The functions illustrated in FIG. 3 are realized by the typical computer executing an SIP proxy program.

The storage device 10 is a read only memory (ROM), a random access memory (RAM), a hard disk, or the like and stores various kinds of data such as input data, output data, and intermediate data for the processing apparatus 20 executing processing. The processing apparatus 20 is a central processing unit (CPU) and executes processing of the SIP proxy server 1 by reading and writing data stored in the storage device 10 and inputting and outputting data to and from the communication control apparatus 30.

The storage device 10 stores the SIP proxy program and stores dialog correspondence data 11. The dialog correspondence data 11 associates information for specifying a dialog established by the SIP proxy server 1 with SDP data most recently (last) transmitted or received in the dialog, in response to one call from the originating-side network 6.

In the case of the example illustrated in FIG. 1, for example, the dialog correspondence data 11 associates the originating-side network 6 with Early dialog #0 and associates SDP data finally transmitted or received in the dialog of Early dialog #0. Further, the dialog correspondence data 11 associates Early dialog #1 on the originating-side with Early dialog #1 to Early dialog #3 on the incoming-side and associates Early dialog #1 to Early dialog #3 with SDP data most recently transmitted or received.

Note that it is only necessary for the dialog correspondence data 11 to be associated with the SDP data most recently transmitted or received in each dialog or the dialog correspondence data 11 may be a log of the SDP data transmitted or received in each dialog.

The processing apparatus 20 includes a forking termination unit 21. The forking termination unit 21 terminates a forking function in the incoming-side network 7 and relays communication with the forking-non-compatible originating-side network 6. Also, the forking termination unit 21 associates the dialog in the originating-side network 6 with the dialogs in the incoming-side network 7, associates the SDP data most recently transmitted or received with each dialog, and updates the dialog correspondence data 11.

The forking termination unit 21 transfers an Initial Invite message received from the originating-side network 6 to the incoming-side network 7 and transfers an 18X message received at the first time from the incoming-side network 7 to the originating-side network 6.

In response to receiving the Initial INVITE request message from the originating-side network 6, the forking termination unit 21 transmits the Initial INVITE request message to the incoming-side network 7. In response to receiving an 18X response message at the first time from the incoming-side network 7, in a case in which the 18X response message received at the first time includes SDP answer data, the forking termination unit 21 transmits the 18X response message including the SDP answer data to the originating-side network 6. In a case in which the 18X response message received at the first time does not include SDP answer data, the forking termination unit 21 transmits the 18X response message to the originating-side network 6. The forking termination unit 21 establishes a originating-side early dialog (Early dialog #0) between the forking termination unit 21 and the originating-side network 6 and establishes a first incoming-side early dialog (Early dialog #1) corresponding to the incoming-side terminal 3 (first incoming-side terminal 3a) that is a transmission source of the 18X response message received at the first time.

In response to receiving an 18X response message at the second time from the incoming-side network 7, the forking termination unit 21 transfers SDP data, for which a medium is intended to be changed, in the SDP data received at the second time or later to the originating-side network 6 and stores the SDP data in the dialog correspondence data 11. The SDP data, for which a medium is intended to be changed, is data obtained by setting a P-Early-Media header including a "sendrecv" or "sendonly" parameter along with the SDP data for an 18X message or an UPDATE message received from the incoming-side network 7. The P-Early-Media header is set when sending of an early medium is started or restarted. The forking termination unit 21 stores the SDP data, for which a medium is not intended to be changed, in the SDP data received at the second time or later, in the dialog correspondence data 11 without transferring the SDP data to the originating-side network 6. The forking termination unit 21 establishes a second incoming-side early dialog (Early Dialog #2) corresponding to the incoming-side terminal 3 (second incoming-side terminal 3b) that is a transmission source of the 18X response message received at the second time.

Referring to FIG. 5 to FIG. 17, processing of the forking termination unit 21 will be described. In the embodiment of the present invention, Call-ID=c0 is set for a message transmitted or received between the SIP proxy server 1 and the originating-side network 6, f) is set for a From-tag, and t0 is set for a To-tag. Call-1D=c1 is set for a message transmitted or received between the SIP proxy server 1 and the incoming-side network 7 in relation to the first incoming-side terminal 3a, f1 is set for a From-tag, and t1 is set for a To-tag. Call-ID=c1 is set for a message transmitted or received between the SIP proxy server 1 and the incoming-side network 7 in relation to the second incoming-side terminal 3b, f2 is set for a From-tag, and t2 is set for a To-tag.

Processing Performed when 18X Message is Received at the First Time

Figure 5:
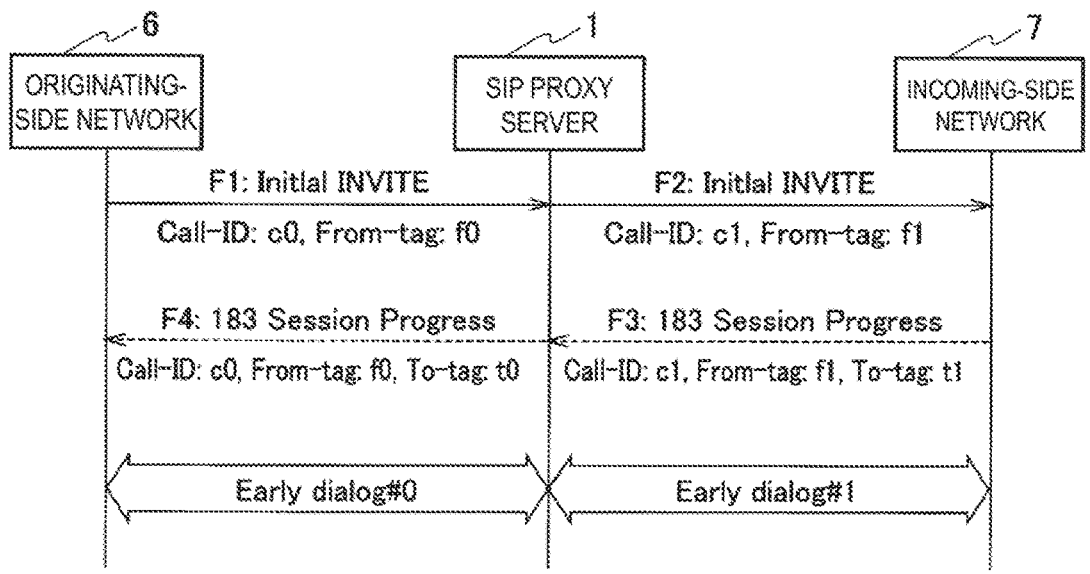
FIG. 5 is a sequence diagram for explaining processing performed in a case in which an 18X message received first from an incoming-side network does not include an SDP answer.
Figure 6:
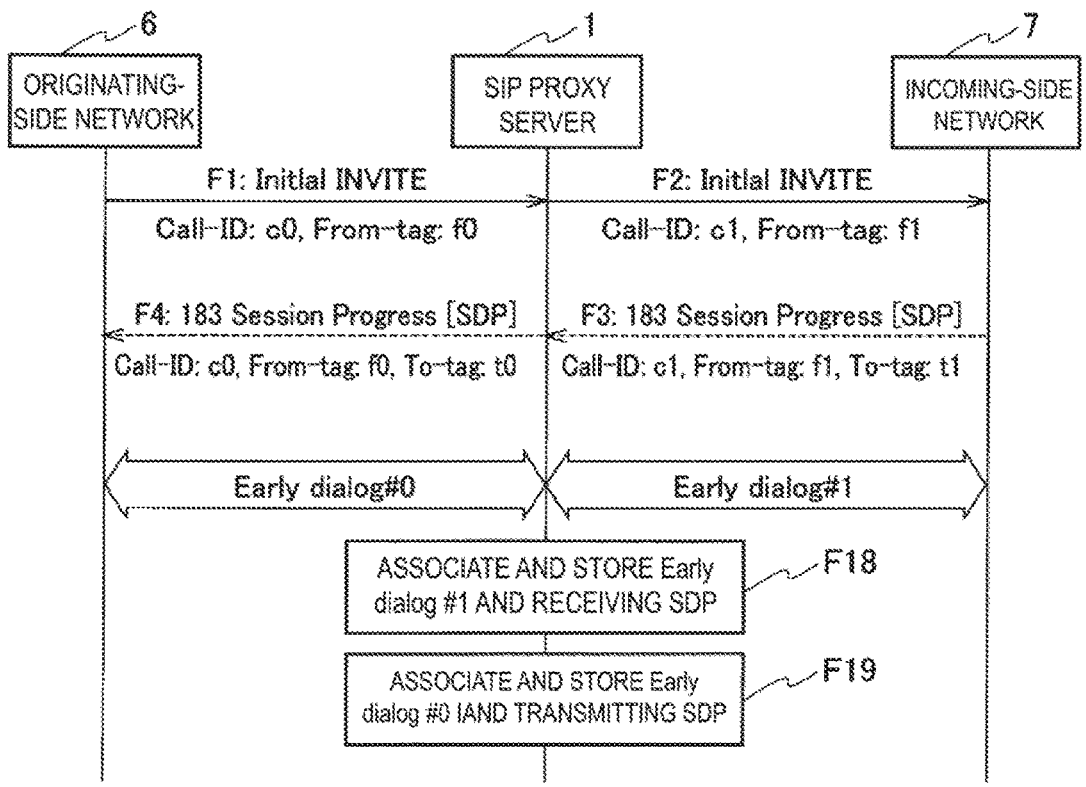
FIG. 6 is a sequence diagram for explaining processing performed in a case in which an 18X message received first from the incoming-side network includes an SDP answer.

FIG. 5 and FIG. 6 illustrate processing performed when the SIP proxy server 1 received an 18X message at the first time after sending the Initial Invite message received from the originating-side network 6 to the incoming-side network 7.

FIG. 5 illustrates processing performed in a case in which an 18X message received at the first time from the incoming-side network 7 does not include an SDP answer.

In response to receiving an Initial Invite message from the originating-side network 6 in F1, the SIP proxy server 1 transfers the Initial Invite message to the incoming-side network 7 in F2. The Initial Invite message is transferred to the first incoming-side terminal 3a, the second incoming-side terminal 3b, and the third incoming-side terminal 3c in the incoming-side network 7.

In response to receiving a 183 Session Progress message that does not include SDP answer from the incoming-side network 7 in relation to the first incoming-side terminal 3a in F3, the SIP proxy server 1 transfers the 183 Session Progress message to the originating-side network 6 in F4.

Here, Early dialog #0 is established between the SIP proxy server 1 and the originating-side network 6, and Early dialog #1 in relation to the first incoming-side terminal 3a is established between the SIP proxy server 1 and the incoming-side network 7.

FIG. 6 illustrates processing in a case in which an 18X message received at the first time from the incoming-side network 7 includes an SDP answer. The processing illustrated in FIG. 6 is different from that in FIG. 5 in that the 183 Session Progress message received in F3 includes an SDP answer, and processing in F1 and F2 is similar to that in FIG. 5.

In F3, the SIP proxy server 1 receives the 183 Session Progress message including an SDP answer. The SIP proxy server 1 transfers the 183 Session Progress message including the SDP answer, which has been received in F3, to the originating-side network 6 in F4.

After Early dialog #0 and Early dialog #1 are established, the SIP proxy server 1 associates Early dialog #1 with received SDP, which has been received in F3, and stores Early dialog #1 and the received SDP in association with each other in the dialog correspondence data 11 in F8. In F9, the SIP proxy server 1 associates Early dialog #0 with transmitted SDP, which has been transmitted in F4, and stores Early dialog #0 and the transmitted SDP in association with each other in the dialog correspondence data 11.

Processing Performed When 18X Message is Received at the second time or Later In response to receiving an 18X response message including SDP answer data from the incoming-side network 7 in a state where no SDP answer data has been returned yet to the originating-side network 6, the forking termination unit 21 transmits an 18X response message including the SDP answer data included in the received 18X response message in the originating-side early dialog (Early dialog #0).

Also, in response to receiving an 18X response message including a P-Early-Media header, for which sendrecv or sendonly has been set, and SDP answer data from the incoming-side network 7 in a state where SDP answer data has been returned to the originating-side network 6, the forking termination unit 21 transmits an UPDATE request message, for which SDP offer data that is SDP answer data has been set, in the originating-side early dialog (Early dialog #0).

In response to receiving an 18X response message including a P-Early-Media header, for which neither sendrecv nor sendonly has been set, and SDP answer data from the incoming-side network 7 in a state where SDP answer data has been returned to the originating-side network 6, the forking termination unit 21 associates and stores an incoming-side early dialog (Early Dialog #2) corresponding to the incoming-side terminal 3 (second incoming-side terminal 3b) that is a transmission source of the 18X response and SDP data included in the received 18X response message in an associated manner.

Figure 7:
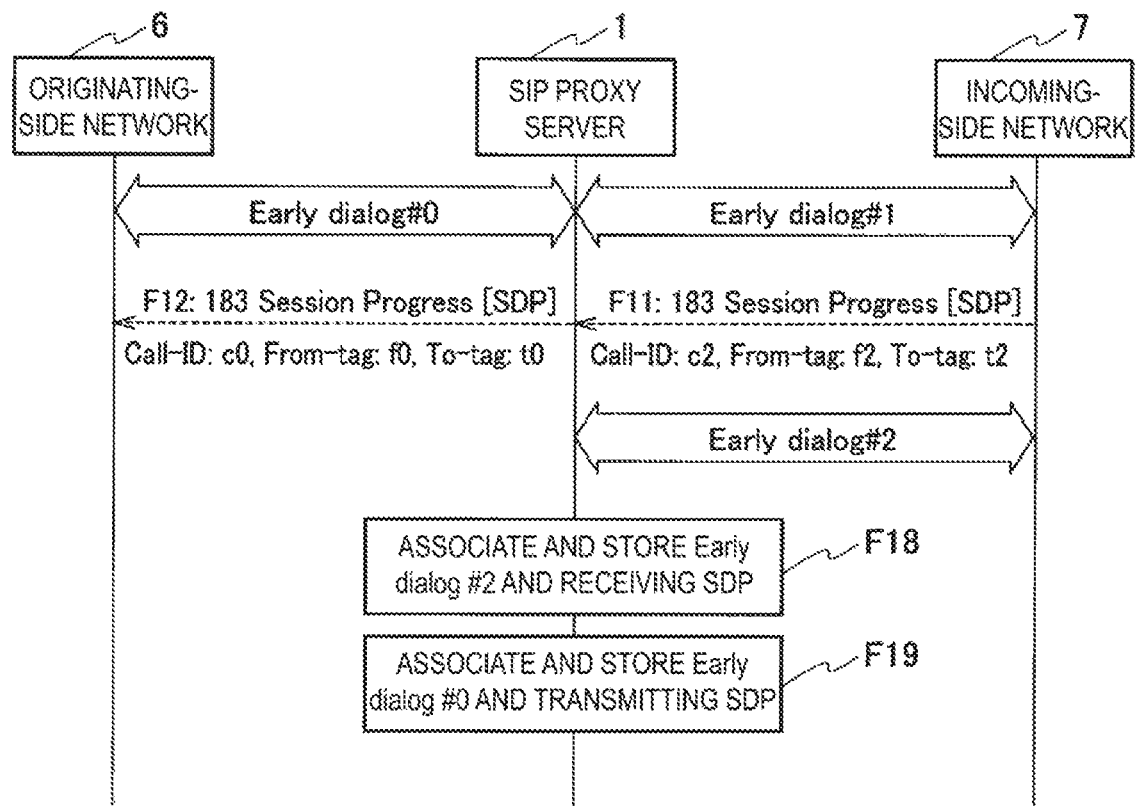
FIG. 7 is a sequence diagram for explaining processing performed in a case in which an 18X message received in a state where no SDP answer has been returned yet includes an SDP answer.
Figure 8:
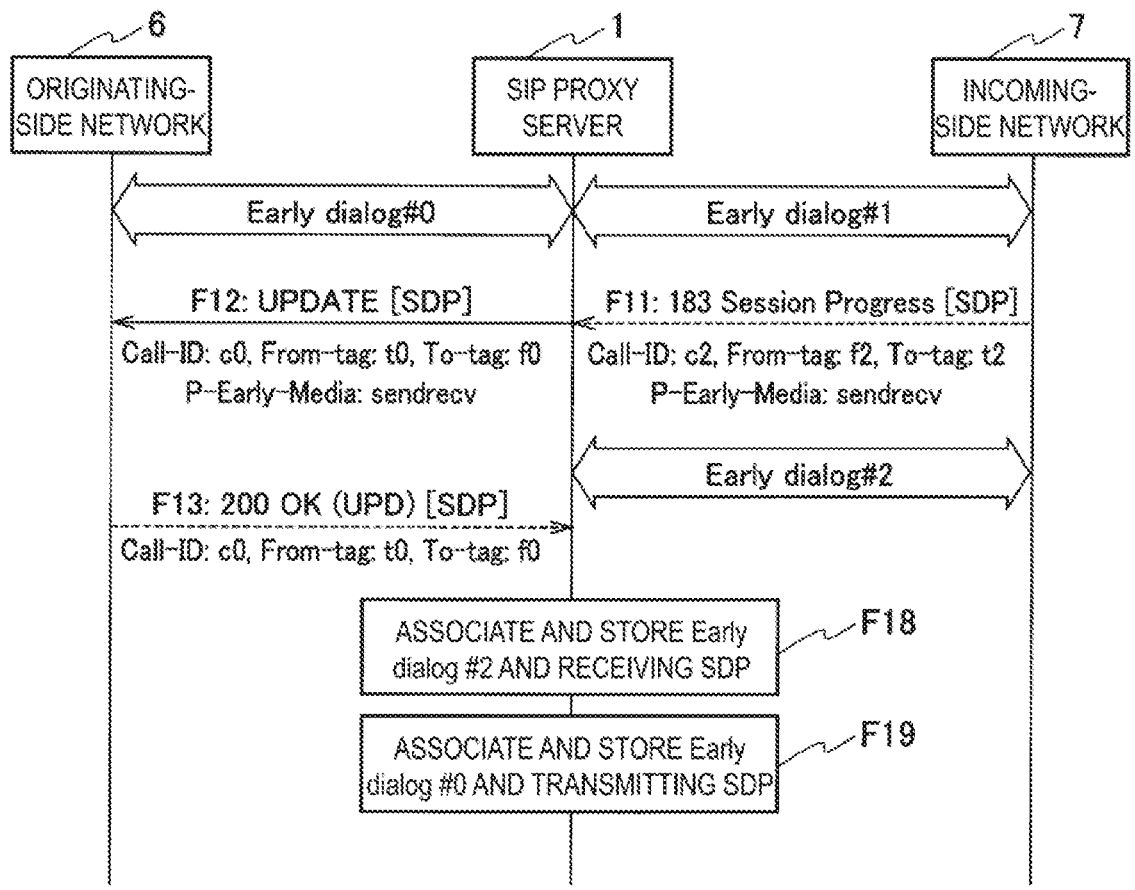
FIG. 8 is a sequence diagram for explaining processing performed in a case in which an 18X message received in a state where an SDP answer has been returned includes an SDP answer and has a P-Early-Media header with sendrecv or sendonly set.
Figure 9:
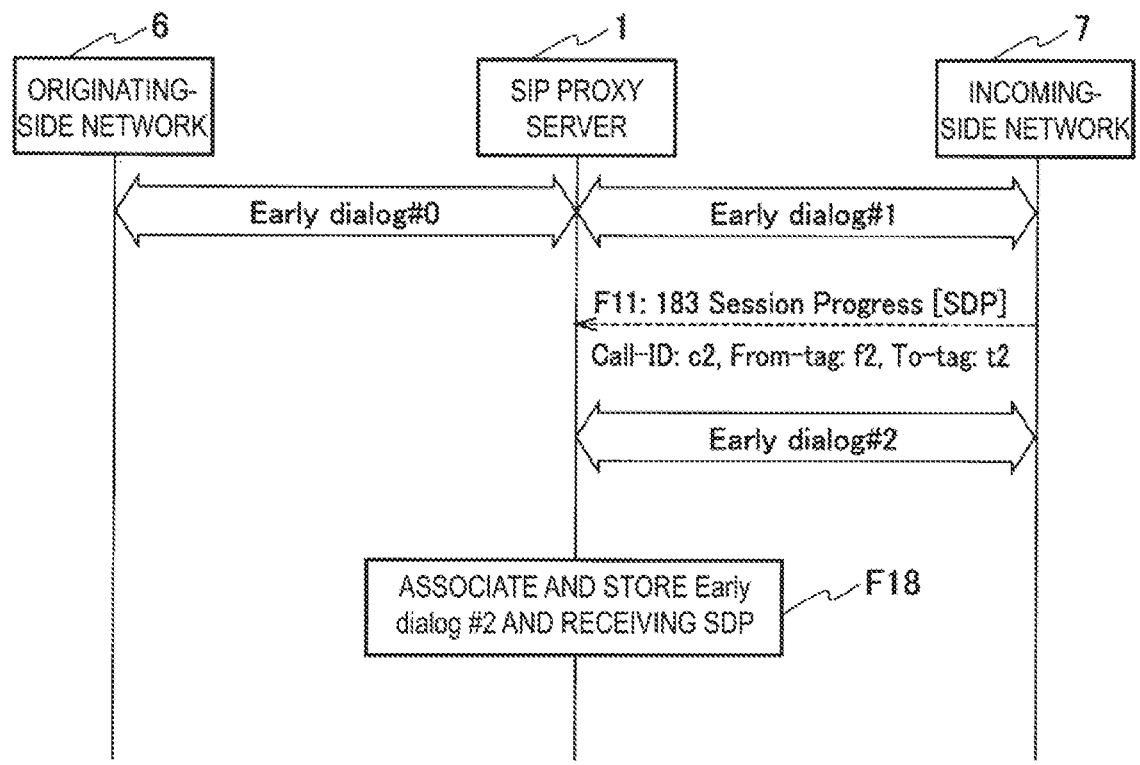
FIG. 9 is a sequence diagram for explaining processing performed in a case in which an 18X message received in a state where an SDP answer has been returned includes an SDP answer and does not have a P-Early-Media header.

FIG. 7 to FIG. 9 illustrate processing performed in response to receiving an 18X message at the second time or later. In this stage, Early dialog #0 and Early dialog #1 have been established.

FIG. 7 illustrates processing performed in a case in which an 18X message received in a state where no SDP answer has been returned yet includes an SDP answer.

The SIP proxy server 1 receives a 183 Session Progress message, which includes an SDP answer, for which no P-Early-Media is set, from the incoming-side network 7 in relation to the second incoming-side terminal 3b in F11. The SIP proxy server 1 transfers the 183 Session Progress message including the SDP answer, which has been received in F11, to the originating-side network 6 using Early dialog #0 in F12.

Here, Early dialog #2 in relation to the second incoming-side terminal 3b is established between the SIP proxy server 1 and the incoming-side network 7.

After Early dialog #2 is established, the SIP proxy server 1 associates Early dialog #2 with the received SDP, which has been received in F11, and stores Early dialog #2 and the received SDP in association with each other in the dialog correspondence data 11 in F18. In F19, the SIP proxy server 1 associates Early dialog #0 with transmitted SDP, which has been transmitted in F12, and stores Early dialog #0 and the transmitted SDP in association with each other in the dialog correspondence data 11.

FIG. 8 illustrates processing performed in a case in which an 18X message received in a state where an SDP answer has been returned includes an SDP answer and has a P-Early-Media header, for which sendrecv or sendonly has been set.

The SIP proxy server 1 receives a 183 Session Progress message that includes an SDP answer and has a P-Early-Media header, for which sendrecv or sendonly has been set from the incoming-side network 7 in relation to the second incoming-side terminal 3b in F11. The SIP proxy server 1 transmits an UPDATE message that includes an SDP offer that is the SDP answer received in F11 and has a P-Early-Media header, for which sendrecv or sendonly has been set, to the originating-side network 6 using Early Dialog #0 in F12.

Here, Early Dialog #2 in relation to the second incoming-side terminal 3b is established between the SIP proxy server 1 and the incoming-side network 7.

The SIP proxy server 1 receives a 200OK message for the UPDATE message transmitted in F12 from the originating-side network 6 in F13. Here, the SIP proxy server 1 does not interwork, with the incoming-side network 7, the 200OK message for the UPDATE message received from the originating-side network 6.

After Early Dialog #2 is established, the SIP proxy server 1 associates Early Dialog #2 with the received SDP, which has been received in F11, and stores Early Dialog #2 and the received SDP in association with each other in the dialog correspondence data 11 in F18. In F19, the SIP proxy server 1 associates Early Dialog #0 with the transmitted SDP, which has been transmitted in F12, and stores Early Dialog #0 and the transmitted SDP in association with each other in the dialog correspondence data 11.

FIG. 9 illustrates processing performed in a case in which an 18X message received in a state where an SDP answer has been returned and does not have a P-Early-Media header.

In F1, the SIP proxy server 1 receives a 183 Session Progress message, which includes an SDP answer, for which no P-Early-Media is set, from the incoming-side network 7 in relation to the second incoming-side terminal 3b. The SIP proxy server 1 does not interwork with the originating-side network 6 at all.

Here, Early Dialog #2 in relation to the second incoming-side terminal 3b is established between the SIP proxy server 1 and the incoming-side network 7.

After Early dialog #2 is established, the SIP proxy server 1 associates Early dialog #2 with the received SDP, which has been received in F11, and stores Early dialog #2 and the received SDP in association with each other in the dialog correspondence data 11 in F18.

Processing when UPDATE Message is Received

In response to receiving an UPDATE message that includes an SDP offer and has a P-Early-Media header, for which sendrecv or sendonly has been set from the incoming-side network 7, the forking termination unit 21 transfers the UPDATE message to the incoming-side network 7. In response to receiving an UPDATE message that includes an SDP offer and does not have a P-Early-Media header, for which sendrecv or sendonly has been set, from the incoming-side network 7, the forking termination unit 21 does not transfer the UPDATE message to the incoming-side network 7. In response to receiving an UPDATE message including the SDP offer from the originating-side network 6, the forking termination unit 21 transfers the UPDATE message to the incoming-side network 7. At this time, the forking termination unit 21 associates the received SDP and the transmitted SDP with dialogs on which the received SDP and the transmitted SDP have been received or transmitted and stores the received SDP and the transmitted SDP in association with the dialogs in the dialog correspondence data 11.

Figure 10:
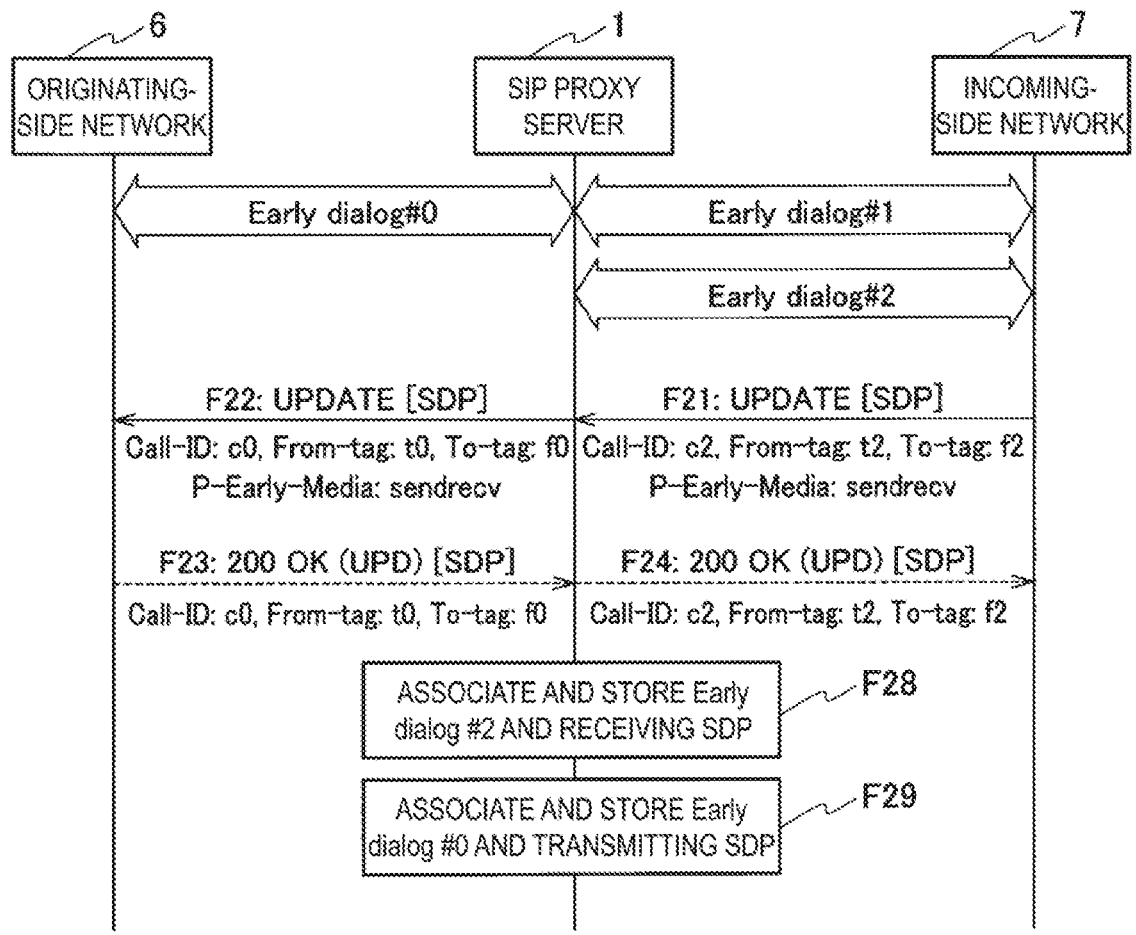
FIG. 10 is a sequence diagram for explaining processing performed in a case in which an UPDATE message received from the incoming-side network includes an SDP offer and has a P-Early-Media header.
Figure 11:
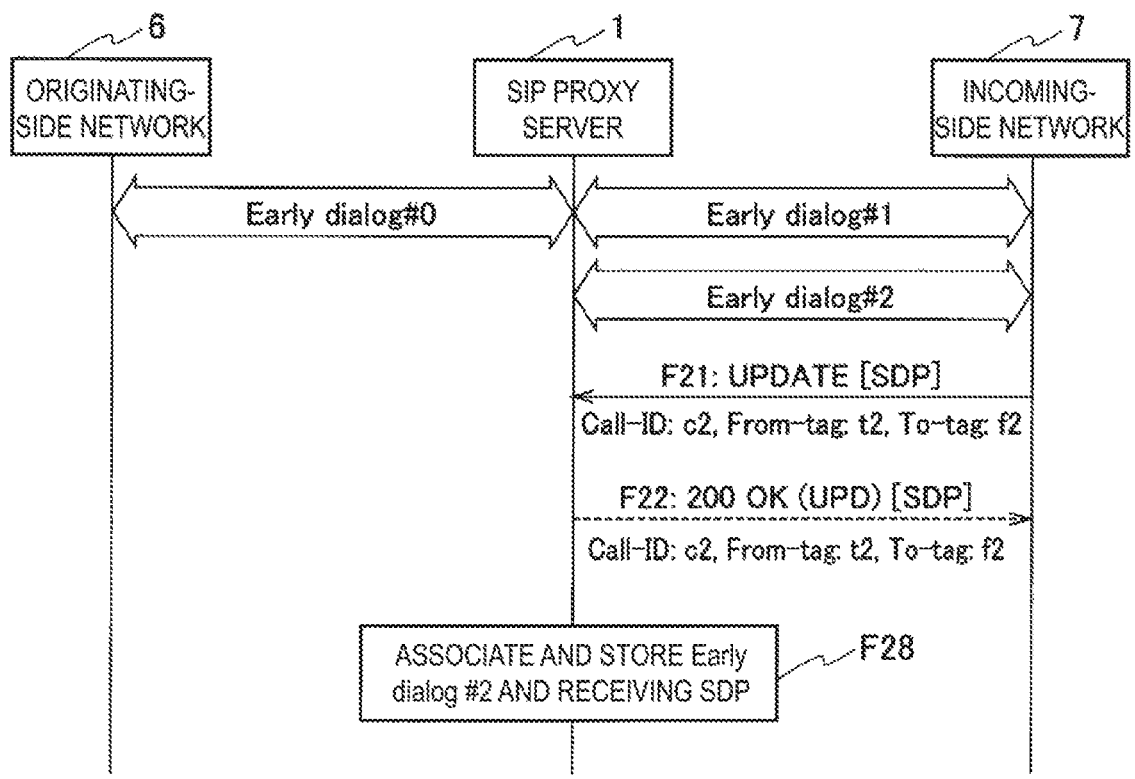
FIG. 11 is a sequence diagram for explaining processing performed in a case in which an UPDATE message received from the incoming-side network includes an SDP offer and does not have a P-Early-Media header.
Figure 12:
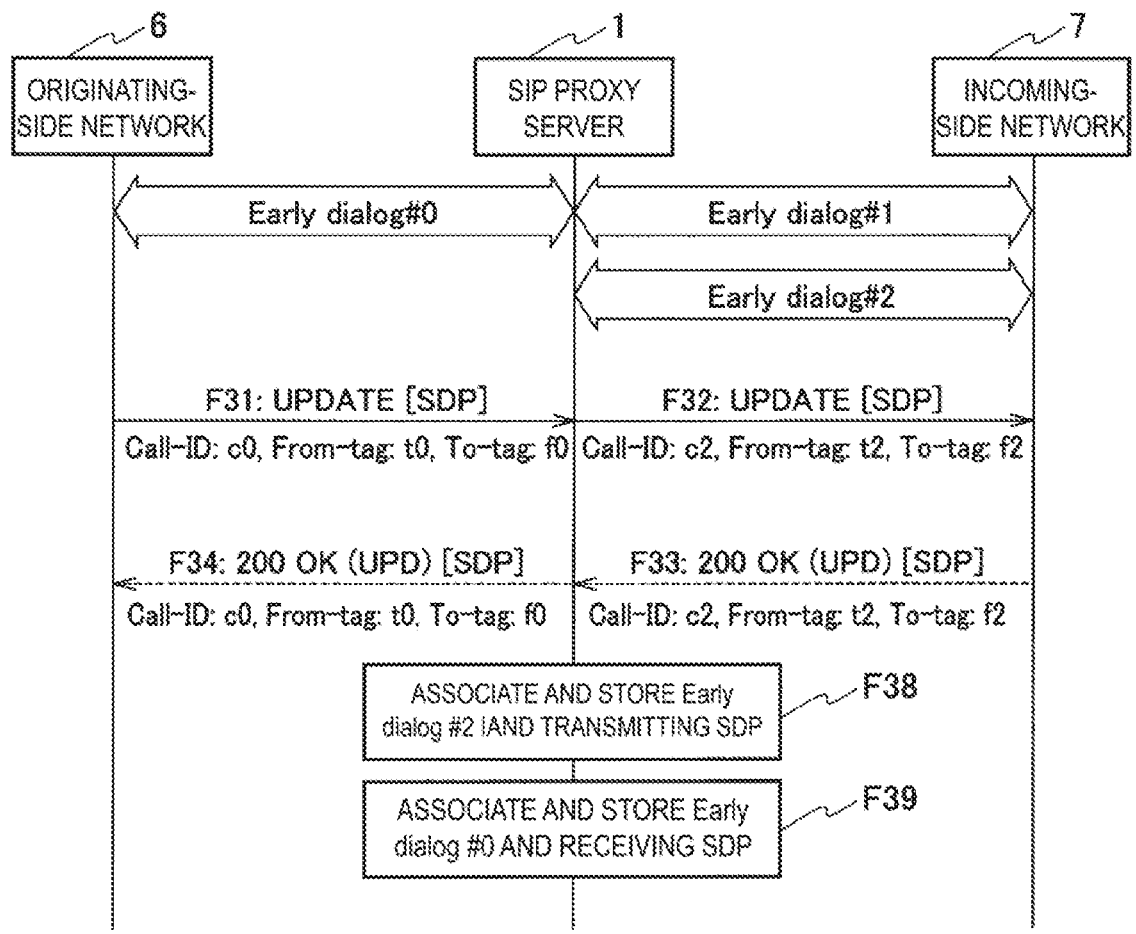
FIG. 12 is a sequence diagram for explaining processing performed in a case in which an UPDATE message received from a originating-side network includes an SDP offer.

FIG. 10 to FIG. 12 illustrate processing performed in response to receiving an UPDATE message. In this stage, Early dialog #0 to Early dialog #2 have been established.

FIG. 10 illustrates processing performed in a case in which an UPDATE message received from the incoming-side network 7 includes an SDP offer and has a P-Early-Media header.

The SIP proxy server 1 receives an UPDATE message that includes an SDP offer and has a P-Early-Media header, for which sendrecv or sendonly has been set from the incoming-side network 7 using Early dialog #2 in F21. The SIP proxy server 1 transmits an UPDATE message that includes the SDP offer received in F21 and has a P-Early-Media header, for which sendrecv or sendonly has been set to the originating-side network 6 using Early dialog #0 in F22.

The SIP proxy server 1 receives a 200OK message for the UPDATE message, which has been transmitted in F22, from the originating-side network 6 using Early dialog #0 in F23. The SIP proxy server 1 transmits a 200OK message for the UPDATE message, which has been received in F21, to the incoming-side network 7 using Early dialog #2 in F24.

In F28, the SIP proxy server 1 associates Early dialog #2 with the received SDP, which has been received in F21, and stores Early dialog #2 and the received SDP in association with each other in the dialog correspondence data 11. In F29, the SIP proxy server 1 associates Early dialog #0 with the transmitted SDP, which has been transmitted in F22, and stores Early dialog #0 and the transmitted SDP in association with each other in the dialog correspondence data 11.

FIG. 11 illustrates processing performed in a case in which an UPDATE message received from the incoming-side network 7 includes an SDP offer and does not have a P-Early-Media header.

The SIP proxy server 1 receives an UPDATE message, which includes an SDP offer, for which no P-Early-Media has been set, from the incoming-side network 7 using Early dialog #2 in F21. Thereafter, the SIP proxy server 1 does not interwork with the originating-side network 6 at all.

In F28, the SIP proxy server 1 associates Early dialog #2 with the received SDP, which has been received in F21, and stores Early dialog #2 and the received SDP in association with each other in the dialog correspondence data 11.

FIG. 12 illustrates processing performed in a case in which an UPDATE message received from the originating-side network 6 includes an SDP offer.

The SIP proxy server 1 receives the UPDATE message including the SDP offer from the originating-side network 6 using Early dialog #0 in F31. Here, the SIP proxy server 1 specifies a dialog of a transmission source of an SDP that is a source of an SDP transmitted immediately before to the originating-side network 6. In the embodiment of the present invention, it is assumed that an SDP received immediately before on Early dialog #2 has been transmitted to the originating-side network 6. The SIP proxy server 1 transmits the UPDATE message including the SDP offer, which has been received in F31, to the incoming-side network 7 using Early dialog #2 in F32.

The SIP proxy server 1 receives a 200OK message for the UPDATE message, which has been transmitted in F32, from the incoming-side network 7 using Early dialog #2 in F33. The SIP proxy server 1 transmits a 200OK message for the UPDATE message, which has been received in F31, to the originating-side network 6 using Early dialog #0 in F34.

In F38, the SIP proxy server 1 associates Early dialog #2 with the transmitted SDP, which has been transmitted in F32, and stores Early dialog #2 and the transmitted SDP in association with each other in the dialog correspondence data 11. In F39, the SIP proxy server 1 associates Early dialog #0 with the received SDP, which has been received in F31, and stores Early dialog #0 and the received SDP in association with each other in the dialog correspondence data 11.

Processing Performed when 200OK Message is Received

In response to receiving a 200OK response message for an Initial INVITE request message including SDP answer data, and in a case in which no SDP answer data has been returned yet to the originating-side network 6, the forking termination unit 21 transmits a 200OK response message for the Initial INVITE request message including the SDP answer data included in the 200OK response message in a originating-side early dialog (Early dialog #0).

In a case in which SDP answer data has been returned to the originating-side network 6, the forking termination unit 21 compares the SDP answer data included in the 200OK response message with SDP data last transmitted to or received from the originating-side network 6. In a case in which there is a difference, the forking termination unit 21 generates SDP offer data to be transmitted to the originating-side network from the SDP answer data included in the 200OK response message, transmits an UPDATE request message, for which the generated SDP offer data has been set, in the originating-side early dialog (Early dialog #0), and transmits an 200OK response message for the Initial INVITE request message in the originating-side early dialog (Early dialog #0). In a case in which there is no difference, the forking termination unit 21 transmits a 200OK response message for the Initial INVITE request message that does not include SDP data in the originating-side early dialog (Early dialog #0).

In a case in which a 200OK response message for the Initial INVITE request message that does not include SDP answer data is received, the forking termination unit 21 compares SDP answer data last transmitted or received with SDP data last transmitted to or received from the originating-side network 6, in a dialog on which the 200OK response message has been received. In a case in which there is a difference, the forking termination unit 21 generates SDP offer data to be transmitted to the originating-side network from SDP answer data last transmitted or received in the dialog in which the 200OK response message has been received, transmits an UPDATE request message, for which the generated SDP offer data has been set, in the originating-side early dialog (Early dialog #0), and then transmits a 200OK response message for the Initial INVITE request message in the originating-side early dialog (Early dialog #0). If there is no difference, the forking termination unit 21 transmits a 200OK response message for the Initial INVITE request message that does not include SDP data in the originating-side early dialog (Early dialog #0).

FIG. 13 to FIG. 17 illustrate processing performed in response to receiving a 200OK message for an Initial Invite message from the incoming-side network. Here, a case in which the first incoming-side terminal 3a transmits a 200OK message for an Initial Invite message will be described.

Figure 13:
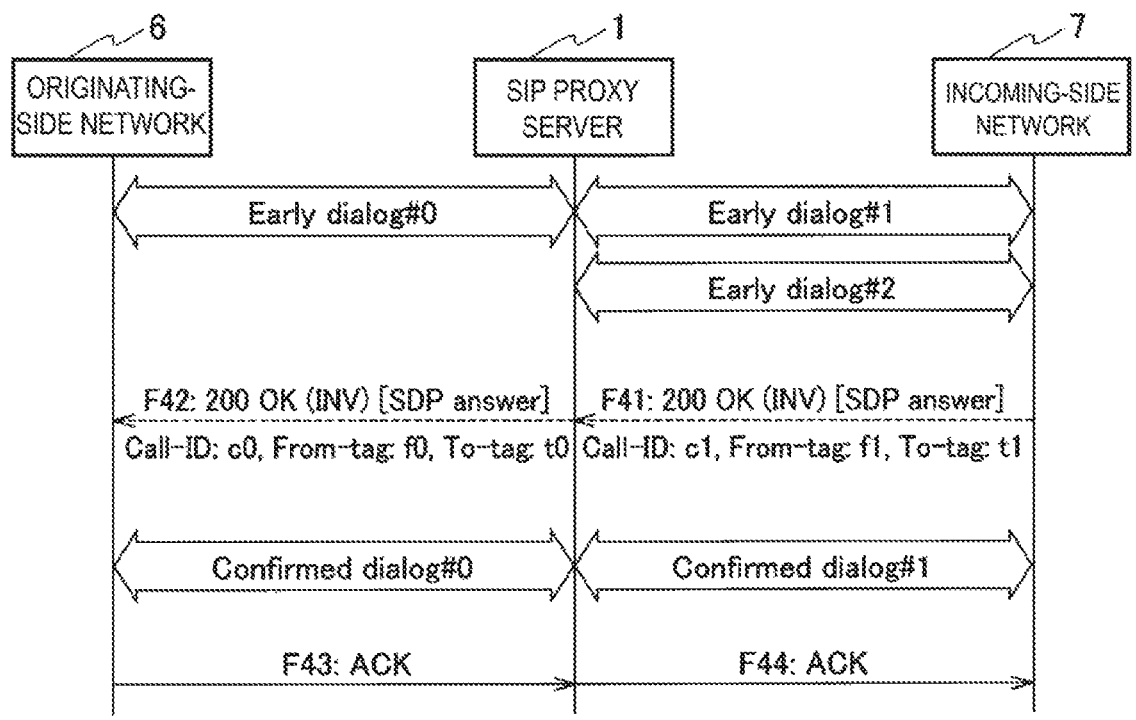
FIG. 13 is a sequence diagram for explaining processing performed in a case in which a 200OK message received in a state where no SDP answer has been returned yet includes an SDP answer.

FIG. 13 illustrates processing performed in a case in which a 200OK message received in a state where no SDP answer has been returned yet includes an SDP answer.

The SIP proxy server 1 receives a 200OK message for an Initial Invite message including an SDP answer using Early dialog #1 of the incoming-side network 7 in F41. The SIP proxy server 1 transmits the 200OK message, which has been received in F41, to the originating-side network 6 using Early dialog #0 in F42. The 200OK message transmitted in F42 includes the SDP answer included in the 200OK message received in F41.

Early dialog #0 transitions to Confirmed dialog #0, and Early dialog #1 transitions to Confirmed dialog #1.

The SIP proxy server 1 receives an ACK message from the originating-side network 6 using Confirmed dialog #0 in F43 and transmits the ACK message to the incoming-side network 7 using Confirmed dialog #1 in F44.

Figure 14:
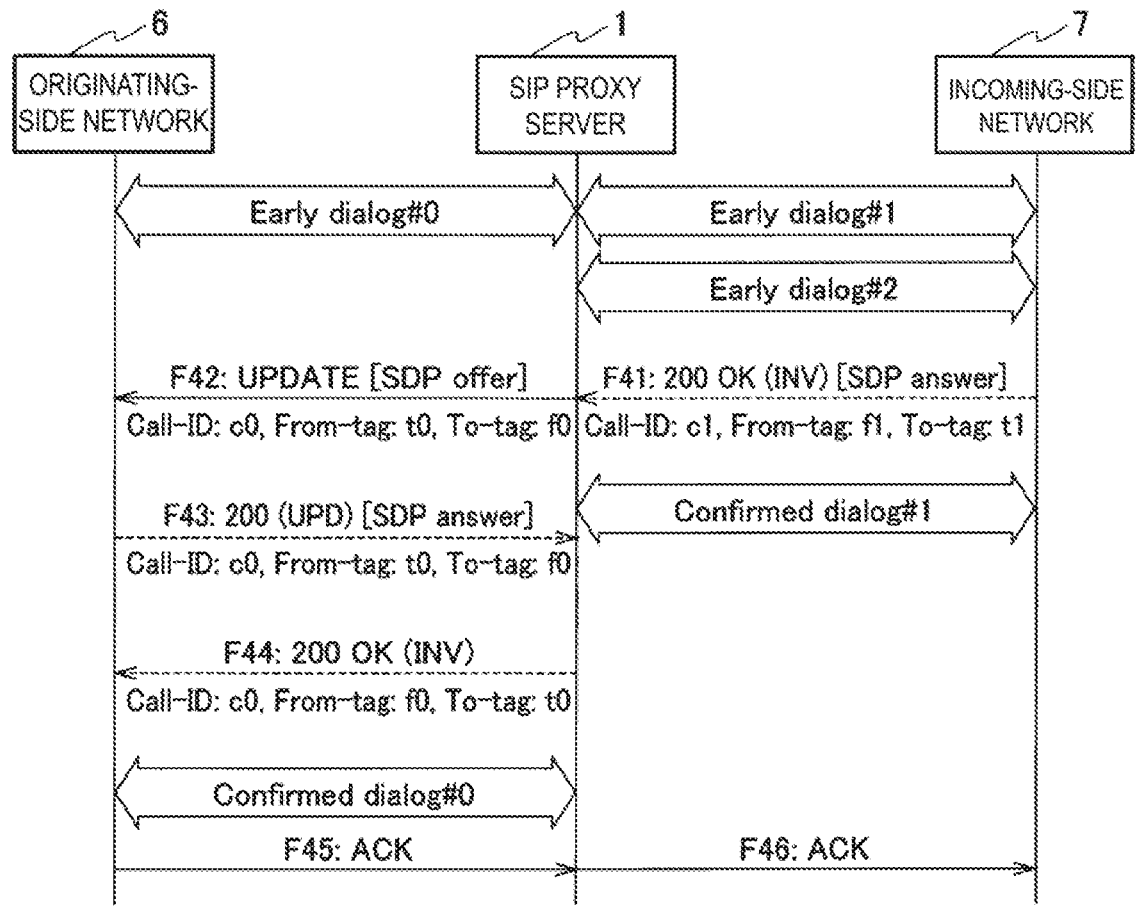
FIG. 14 is a sequence diagram for explaining processing performed in a case in which a 200OK message received in a state where an SDP answer has been returned includes an SDP answer and there is a difference between the SDP answer and an SDP answer most recently transmitted to or received from the originating-side network.

FIG. 14 illustrates processing performed in a case in which a 200OK message received in a state where an SDP answer has been returned includes an SDP answer and there is a difference between the SDP answer and an SDP answer most recently transmitted to or received from the originating-side network 6.

The SIP proxy server 1 receives a 200OK message for an Initial Invite message including an SDP answer using Early dialog #1 of the incoming-side network 7 in F41. The SIP proxy server 1 determines whether there is a difference between the SDP data transmitted or received most recently on Early dialog #0 and the SDP answer received in F41. The SDP data transmitted or received most recently on Early dialog #0 is acquired from the dialog correspondence data 11.

In accordance with a determination that there is a difference, the SIP proxy server 1 transmits an UPDATE message including an SDP offer generated from the SDP answer which has been received in F41 to the originating-side network 6 using Early dialog #1 in F42. The SIP proxy server 1 receives a 200OK message for the UPDATE message, which has been transmitted in F42, from the originating-side network 6 using Early dialog #1 in F43. The SIP proxy server 1 transmits a 200OK message for an Initial Invite message to the originating-side network 6 using Early dialog #1 in F44.

Early dialog #0 transitions to Confirmed dialog #0, and Early dialog #1 transitions to Confirmed dialog #1. The processing in F45 an F46 is similar to those in F43 and F44 in FIG. 13.

Figure 15:
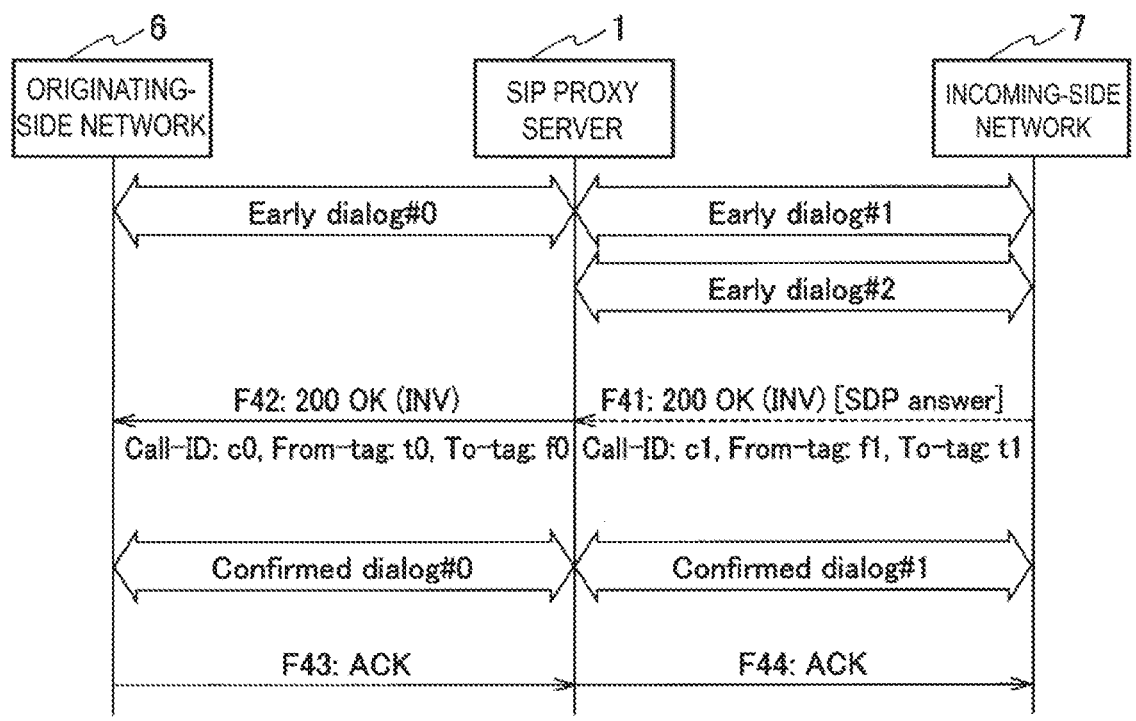
FIG. 15 is a sequence diagram for explaining processing performed in a case in which a 200OK message received in a state where an SDP answer has been returned includes an SDP answer and there is no difference between the SDP answer and an SDP answer most recently transmitted to or received from the originating-side network.

FIG. 15 illustrates processing performed in a case in which a 200OK message received in a state where an SDP answer has been returned includes an SDP answer and there is no difference between the SDP answer and an SDP answer most recently transmitted to or received from the originating-side network 6.

The SIP proxy server 1 receives a 200OK message for an Initial Invite message including an SDP answer using Early dialog #1 of the incoming-side network 7 in F41. The SIP proxy server 1 determines whether there is a difference between the SDP data transmitted or received most recently on Early dialog #0 and the SDP answer received in F41.

In accordance with a determination that there is no difference, the SIP proxy server 1 transmits a 200OK message for an Initial Invite message to the originating-side network 6 using Early dialog #1 in F42. The 200OK message transmitted in F42 does not include SDP data.

Early dialog #0 transitions to Confirmed dialog #0, and Early dialog #1 transitions to Confirmed dialog #1. The processing in F43 and F44 is similar to that in F43 and F44 in FIG. 13.

Figure 16:
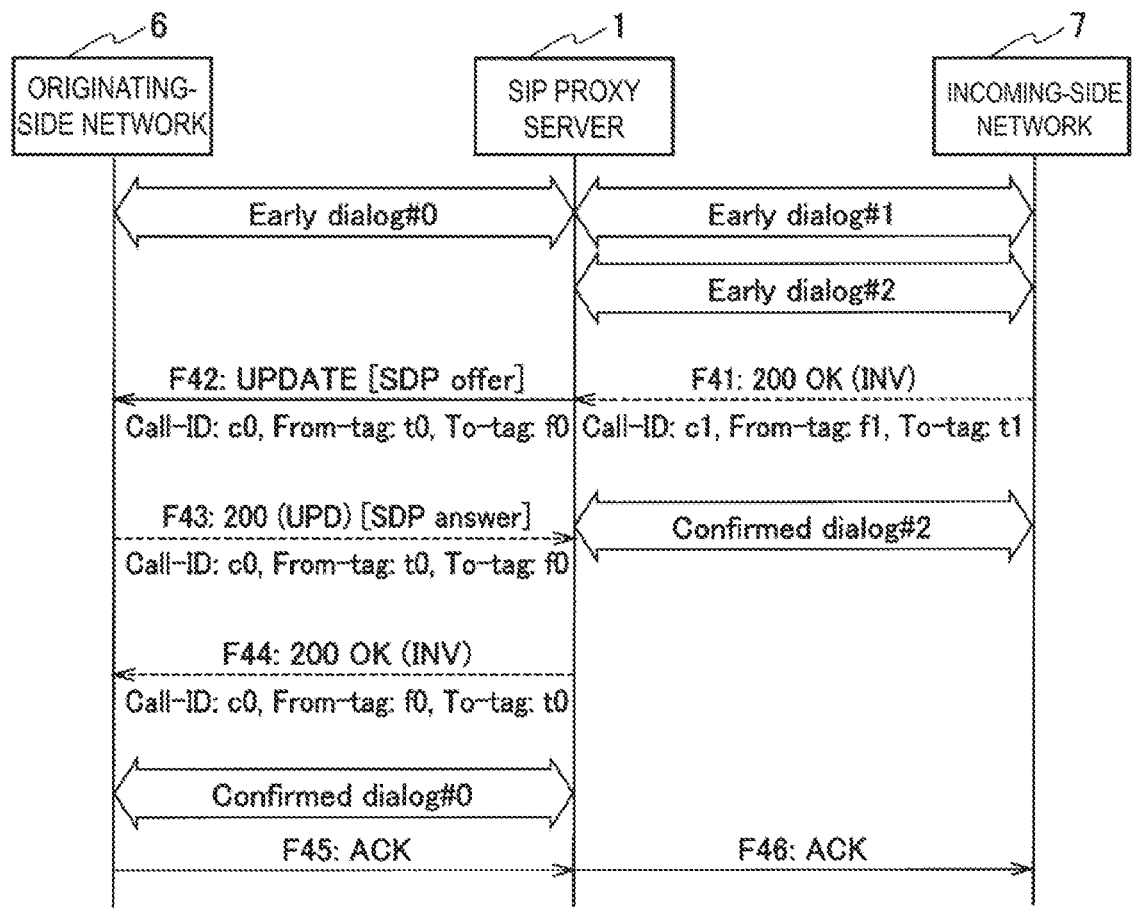
FIG. 16 is a sequence diagram for explaining processing performed in a case in which a 200OK message received in a state where an SDP answer has been returned does not include an SDP answer and there is a difference between an SDP answer most recently transmitted or received in a dialog in which the 200OK message has been received and an SDP answer most recently transmitted to or received from the originating-side network.

FIG. 16 illustrates processing performed in a case in which a 200OK message received in a state where an SDP answer has been returned does not include an SDP answer and there is a difference between an SDP answer transmitted or received most recently in a dialog, on which the 200OK message has been received, and an SDP answer most recently transmitted to or received from the originating-side network 6.

The SIP proxy server 1 receives the 200OK message for the Initial Invite message that does not include SDP answer using Early dialog #1 of the incoming-side network 7 in F41. The SIP proxy server 1 determines whether there is a difference between SDP data transmitted or received most recently on Early dialog #0 and SDP data transmitted or received most recently in the early dialog (Early dialog #1) used for receiving the 200OK message. The SDP data transmitted or received most recently on Early dialog #1 is acquired from the dialog correspondence data 11.

In accordance with a determination that there is a difference, the SIP proxy server 1 transmits an UPDATE message including an SDP offer, which has been generated from SDP data transmitted or received most recently on Early dialog #1, to the originating-side network 6 using Early dialog #0 in F42. The SIP proxy server 1 receives a 200OK message for the UPDATE message, which has been transmitted in F42, from the originating-side network 6 using Early dialog #1 in F43. The SIP proxy server 1 transmits a 200OK message for an Initial Invite message to the originating-side network 6 using Early dialog #1 in F44.

Early dialog #0 transitions to Confirmed dialog #0, and Early dialog #1 transitions to Confirmed dialog #1. The processing in F45 an F46 is similar to those in F43 and F44 in FIG. 13.

Figure 17:
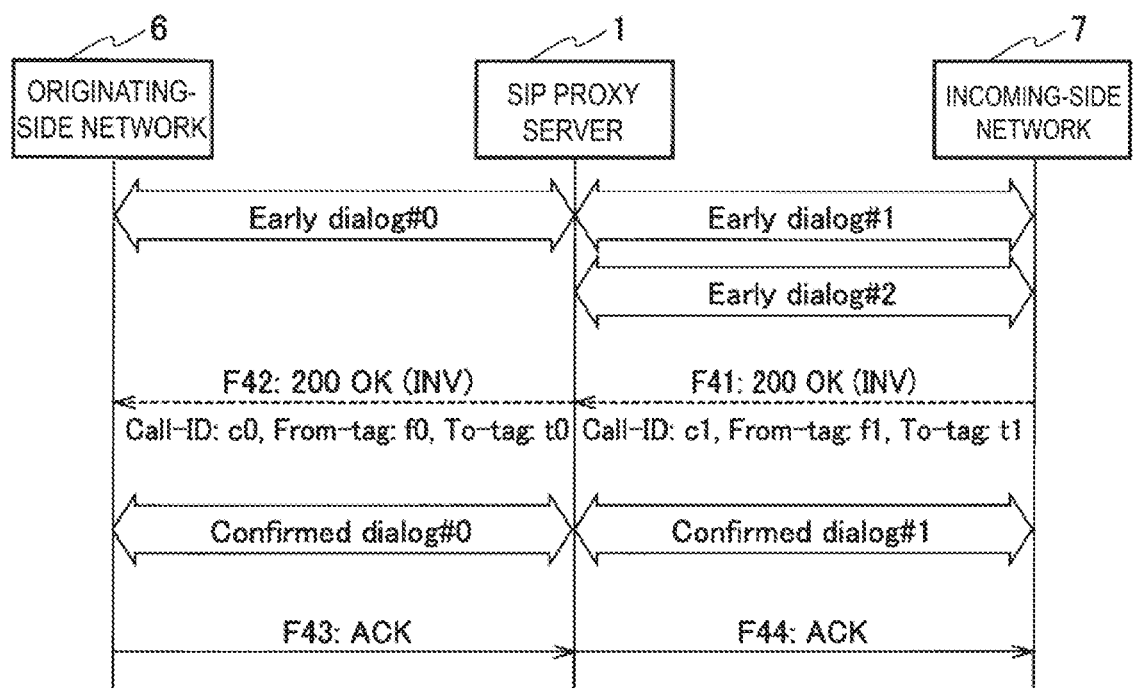
FIG. 17 is a sequence diagram for explaining processing performed in a case in which a 200OK message received in a state where an SDP answer has been returned does not include an SDP answer and there is no difference between an SDP answer most recently transmitted or received in a dialog in which the 200OK message has been received and an SDP answer most recently transmitted to or received from the originating-side network.

FIG. 17 illustrates processing in a case in which a 200OK message received in a state where an SDP answer has been returned does not include an SDP answer and there is no difference between an SDP answer transmitted or received most recently in the dialog, on which the 200OK message has been received, and an SDP answer most recently transmitted to or received from the originating-side network 6.

The SIP proxy server 1 receives the 200OK message for the Initial Invite message that does not include SDP answer using Early dialog #1 of the incoming-side network 7 in F41. The SIP proxy server 1 determines whether there is a difference between SDP data transmitted or received most recently on Early dialog #0 and SDP data transmitted or received most recently in the early dialog (Early dialog #1) used for receiving 200OK.

In accordance with a determination that there is no difference, the SIP proxy server 1 transmits a 200OK message for the Initial Invite message to the originating-side network 6 using Early dialog #0 in F42. The 200OK message transmitted in F42 does not include SDP data.

Early dialog #0 transitions to Confirmed dialog #0, and Early dialog #1 transitions to Confirmed dialog #1. The processing in F43 and F44 is similar to that in F43 and F44 in FIG. 13.

Such an SIP proxy server 1 according to the embodiment of the present invention enables mutual communication between the originating-side network 6 and the incoming-side network 7 by causing the forking-compatible incoming-side network 7 to receive a call from the forking-non-compatible originating-side network 6.

Also, an SDP answer received at the first time from the incoming-side network 7 is transferred to the originating-side network 6. This enables transmission of some SDP data to the originating-side network 6.

The forking termination unit 21 transfers SDP data, for which a change in medium is intended, to the originating-side network 6 and does not transfer SDP data, for which a change in medium is not intended, to the originating-side network 6, in SDP data received at the second time or later. In this manner, SDP data that is to be used immediately by the originating-side network 6 is transmitted soon, and SDP data that is not to be used immediately is held by the SIP proxy server 1.

Furthermore, in response to receiving the 200OK message for the Initial Invite message, control is performed such that data transmitted or received most recently in each dialog conforms to data transmitted or received immediately, which is stored in the dialog correspondence data 11. In this manner, it is possible to use even SDP data, which is not to be used immediately by the originating-side network 6, for talking.

The SIP proxy server 1 according to the embodiment of the present invention can interconnect the originating-side network 6 and the originating-side terminal 2, which are not compatible with forking, and the incoming-side network 7 and the incoming-side terminals 3, which are compatible with forking. Further, in response to receiving a 200OK message for an Initial Invite message, it is possible to curb the amount of data used for communication between the originating-side network 6 and the SIP proxy server 1 by performing control such that data transmitted or received most recently in each dialog conforms to data transmitted or received most recently, which is stored in the dialog correspondence data 11.

Although the embodiment of the present invention has been described above, it should be understood that description and drawings that are parts of the disclosure are not intended to limit the present invention. Various alternative embodiments, examples, and running techniques will become apparent from the disclosure for those skilled in the art.

For example, the SIP proxy server described in the embodiment of the present invention may be configured on a single piece of hardware as illustrated in FIG. 3 or may be configured on a plurality of pieces of hardware in accordance with functions and the number of processes thereof. Also, the SIP proxy server may be implemented on a network apparatus in an existing communication system.

It is a matter of course that various embodiments and the like that are not described herein are also included in the present invention. Therefore, the technical scope of the present invention is defined merely by specific matters of the present invention related to the scope of claims that is reasonable from the above description.

REFERENCE SIGNS LIST

1 SIP proxy server
2 Originating-side terminal
3 Incoming-side terminal
6 Originating-side network
7 Incoming-side network
8 Communication system
10 Storage device
11 Dialog correspondence data
20 Processing apparatus
21 Forking termination unit
30 Communication control apparatus

The invention claimed is:

1. A session initiation protocol (SIP) proxy server connected to an originating-side network to which a forking-non-compatible originating-side terminal belongs and an incoming-side network to which a plurality of forking-compatible incoming-side terminals belong, the SIP proxy server comprising:
a forking termination unit, including one or more processors, configured to,
in response to receiving an Initial INVITE request message from the originating-side network, transmit the Initial INVITE request message to the incoming-side network,
in response to receiving an 18X response message from the incoming-side network at a first time,
in a case where the 18X response message received at the first time includes session description protocol (SDP) answer data, transmit the 18X response message including the SDP answer data to the originating-side network, and
in a case where the 18X response message received at the first time does not include SDP answer data, transmit the 18X response message to the originating-side network,
establish an originating-side early dialog between the SIP proxy server and the originating-side network and establish a first incoming-side early dialog corresponding to an incoming-side terminal that is a transmission source of the 18X response message received at the first time, in response to the originating-side early dialog and first incoming-side early dialog having been established and the 18X response message received at the first time including the SDP answer data, associate the first incoming-side early dialog with the received SDP answer data, store the first incoming-side early dialog and the received SDP answer data in association with each other in dialog correspondence data, associate the originating-side early dialog with the transmitted SDP answer data, and store the originating-side early dialog and the transmitted SDP answer data in association with each other in the dialog correspondence data, and in response to receiving an 18X response message from the incoming-side network at a second time, establish a second incoming-side early dialog corresponding to an incoming-side terminal that is a transmission source of the 18X response message received at the second time.

2. The SIP proxy server according to claim 1, wherein the forking termination unit is further configured to:

in response to receiving an 18X response message including SDP answer data from the incoming-side network in a state where no SDP answer data has been returned to the originating-side network, transmit an 18X response message including the SDP answer data included in the received 18X response message in the originating-side early dialog.

3. The SIP proxy server according to claim 1, wherein the forking termination unit is further configured to:

in response to receiving, from the incoming-side network in a state where SDP answer data has been returned to the originating-side network, an 18X response message including a P-Early-Media header and SDP answer data for which a sendrecv parameter or a sendonly parameter has been set, transmit an UPDATE request message including SDP offer data corresponding to the received SDP answer data in the originating-side early dialog.

4. The SIP proxy server according to claim 1, wherein the forking termination unit is further configured to:

in response to receiving, from the incoming-side network in a state where SDP answer data has been returned to the originating-side network, an 18X response message including a P-Early-Media header and SDP answer data for which a sendrecv parameter or a sendonly parameter has not been set, associate and store an incoming-side early dialog corresponding to an incoming-side terminal that is a transmission source of the 18X response message and the SDP answer data included in the received 18X response message.

5. The SIP proxy server according to claim 1, wherein in response to receiving a 200OK response message for an Initial INVITE request message including SDP answer data, the forking termination unit is configured to:

in a case where no SDP answer data has been returned to the originating-side network, transmit a 200OK response message for an Initial INVITE request message including the SDP answer data included in the 200OK response message in the originating-side early dialog, and in a case where SDP answer data has been returned to the originating-side network, compare the SDP answer data included in the 200OK response message with SDP data last transmitted to or received from the originating-side network, in a case where there is a difference between the SDP answer data included in the 200OK response message and the SDP data last transmitted to or received from the originating-side network, (i) generate SDP offer data to be transmitted to the originating-side network from the SDP answer data included in the 200OK response message, (ii) transmit an UPDATE request message including the generated SDP offer data in the originating-side early dialog, and then (iii) transmit a 200OK response message for the Initial INVITE request message in the originating-side early dialog, and in a case where there is no difference between the SDP answer data included in the 200OK response message and the SDP data last transmitted to or received from the originating-side network, transmit a 200OK response message for an Initial INVITE request message that does not include SDP data in the originating-side early dialog.

6. The SIP proxy server according to claim 1, wherein the forking termination unit is further configured to:

in response to receiving a 200OK response message for an Initial INVITE request message that does not include SDP answer data, compare SDP answer data last transmitted or received with SDP data last transmitted to or received from the originating-side network in a dialog in which the 200OK response message has been received, and in a case where there is a difference between the SDP answer data included in the 200OK response message and the SDP data last transmitted to or received from the originating-side network, (i) generate SDP offer data to be transmitted to the originating-side network from the SDP answer data last transmitted or received in the dialog in which the 200OK response message has been received, (ii) transmit an UPDATE request message including the generated SDP offer data in the originating-side early dialog, and then (iii) transmit a 200OK response message for the Initial INVITE request message in the originating-side early dialog, or in a case where there is no difference between the SDP answer data included in the 200OK response message and the SDP data last transmitted to or received from the originating-side network, transmit a 200OK response message for the Initial INVITE request message that does not include SDP data in the originating-side early dialog.

7. A communication method performed by a session initiation protocol (SIP) proxy server connected to an originating-side network to which a forking-non-compatible originating-side terminal belongs and an incoming-side network to which a plurality of forking-compatible incoming-side terminals belong, the method comprising:

in response to receiving an Initial INVITE request message from the originating-side network, transmitting, at the SIP proxy server, an Initial INVITE request message to the incoming-side network;

in response to receiving an 18X response message from the incoming-side network at a first time, in a case where the 18X response message received at the first time includes session description protocol (SDP) answer data, transmitting, at the SIP proxy server, the 18X response message including the SDP answer data to the originating-side network, and in a case where the 18X response message received at the first time does not include SDP answer data, transmitting, at the SIP proxy server, the 18X response message to the originating-side network;

establishing, at the SIP proxy server, an originating-side early dialog between the SIP proxy server and the originating-side network, and establishing, at the SIP proxy server, a first incoming-side early dialog corresponding to an incoming-side terminal that is a transmission source of the 18X response message received at the first time;

in response to the originating-side early dialog and first incoming-side early dialog having been established and the 18X response message received at the first time including the SDP answer data, associating the first incoming-side early dialog with the received SDP answer data, storing the first incoming-side early dialog and the received SDP answer data in association with each other in dialog correspondence data, associating the originating-side early dialog with the transmitted SDP answer data, and storing the originating-side early dialog and the transmitted SDP answer data in association with each other in the dialog correspondence data; and in response to receiving an 18X response message from the incoming-side network at a second time, establishing, at the SIP proxy server, a second incoming-side early dialog corresponding to an incoming-side terminal that is a transmission source of the 18X response message received at the second time.

8. The communication method according to claim 7, further comprising:

in response to receiving an 18X response message including SDP answer data from the incoming-side network in a state where no SDP answer data has been returned to the originating-side network, transmitting an 18X response message including the SDP answer data included in the received 18X response message in the originating-side early dialog.

9. The communication method according to claim 7, further comprising:

in response to receiving, from the incoming-side network in a state where SDP answer data has been returned to the originating-side network, an 18X response message including a P-Early-Media header and SDP answer data for which a sendrecv parameter or a sendonly parameter has been set, transmitting an UPDATE request message including SDP offer data corresponding to the received SDP answer data in the originating-side early dialog.

10. The communication method according to claim 7, further comprising:

in response to receiving, from the incoming-side network in a state where SDP answer data has been returned to the originating-side network, an 18X response message including a P-Early-Media header and SDP answer data for which a sendrecv parameter or a sendonly parameter has not been set, associating and storing an incoming-side early dialog corresponding to an incoming-side terminal that is a transmission source of the 18X response message and the SDP answer data included in the received 18X response message.

11. The communication method according to claim 7, further comprising:

in response to receiving a 200OK response message for an Initial INVITE request message including SDP answer data, in a case where no SDP answer data has been returned to the originating-side network, transmitting a 200OK response message for an Initial INVITE request message including the SDP answer data included in the 200OK response message in the originating-side early dialog, and in a case where SDP answer data has been returned to the originating-side network, comparing the SDP answer data included in the 200OK response message with SDP data last transmitted to or received from the originating-side network, in a case where there is a difference between the SDP answer data included in the 200OK response message and the SDP data last transmitted to or received from the originating-side network, (i) generating SDP offer data to be transmitted to the originating-side network from the SDP answer data included in the 200OK response message, (ii) transmitting an UPDATE request message including the generated SDP offer data in the originating-side early dialog, and then (iii) transmitting a 200OK response message for the Initial INVITE request message in the originating-side early dialog, and in a case where there is no difference between the SDP answer data included in the 200OK response message and the SDP data last transmitted to or received from the originating-side network, transmitting a 200OK response message for an Initial INVITE request message that does not include SDP data in the originating-side early dialog.

12. The communication method according to claim 7, further comprising:

in response to receiving a 200OK response message for an Initial INVITE request message that does not include SDP answer data, comparing SDP answer data last transmitted or received with SDP data last transmitted to or received from the originating-side network in a dialog in which the 200OK response message has been received, and in a case where there is a difference between the SDP answer data included in the 200OK response message and the SDP data last transmitted to or received from the originating-side network, (i) generating SDP offer data to be transmitted to the originating-side network from the SDP answer data last transmitted or received in the dialog in which the 200OK response message has been received, (ii) transmitting an UPDATE request message including the generated SDP offer data in the originating-side early dialog, and then (iii) transmitting a 200OK response message for the Initial INVITE request message in the originating-side early dialog, or in a case where there is no difference between the SDP answer data included in the 200OK response message and the SDP data last transmitted to or received from the originating-side network, transmitting a 200OK response message for the Initial INVITE request message that does not include SDP data in the originating-side early dialog.

13. A non-transitory computer readable medium storing instructions that when executed by a computer cause the computer to function as a session initiation protocol (SIP) proxy server to perform a communication method, wherein the SIP proxy server is connected to an originating-side network to which a forking-non-compatible originating-side terminal belongs and an incoming-side network to which a plurality of forking-compatible incoming-side terminals belong, the method comprising:

in response to receiving an Initial INVITE request message from the originating-side network, transmitting, at the SIP proxy server, an Initial INVITE request message to the incoming-side network;
in response to receiving an 18X response message from the incoming-side network at a first time,
in a case where the 18X response message received at the first time includes session description protocol (SDP) answer data, transmitting, at the SIP proxy server, the 18X response message including the SDP answer data to the originating-side network, and
in a case where the 18X response message received at the first time does not include SDP answer data, transmitting, at the SIP proxy server, the 18X response message to the originating-side network;
establishing, at the SIP proxy server, an originating-side early dialog between the SIP proxy server and the originating-side network, and establishing, at the SIP proxy server, a first incoming-side early dialog corresponding to an incoming-side terminal that is a transmission source of the 18X response message received at the first time;
in response to the originating-side early dialog and first incoming-side early dialog having been established and the 18X response message received at the first time including the SDP answer data, associating the first incoming-side early dialog with the received SDP answer data, storing the first incoming-side early dialog and the received SDP answer data in association with each other in dialog correspondence data, associating the originating-side early dialog with the transmitted SDP answer data, and storing the originating-side early dialog and the transmitted SDP answer data in association with each other in the dialog correspondence data; and
in response to receiving an 18X response message from the incoming-side network at a second time, establishing, at the SIP proxy server, a second incoming-side early dialog corresponding to an incoming-side terminal that is a transmission source of the 18X response message received at the second time.

14. The non-transitory computer readable medium according to claim 13, wherein the communication method further comprises:
in response to receiving an 18X response message including SDP answer data from the incoming-side network in a state where no SDP answer data has been returned to the originating-side network, transmitting an 18X response message including the SDP answer data included in the received 18X response message in the originating-side early dialog.

15. The non-transitory computer readable medium according to claim 13, wherein the communication method further comprises:
in response to receiving, from the incoming-side network in a state where SDP answer data has been returned to the originating-side network, an 18X response message including a P-Early-Media header and SDP answer data for which a sendrecv parameter or a sendonly parameter has been set, transmitting an UPDATE request message including SDP offer data corresponding to the received SDP answer data in the originating-side early dialog.

16. The non-transitory computer readable medium according to claim 13, wherein the communication method further comprises:
in response to receiving, from the incoming-side network in a state where SDP answer data has been returned to the originating-side network, an 18X response message including a P-Early-Media header and SDP answer data for which a sendrecv parameter or a sendonly parameter has not been set, associating and storing an incoming-side early dialog corresponding to an incoming-side terminal that is a transmission source of the 18X response message and the SDP answer data included in the received 18X response message.

17. The non-transitory computer readable medium according to claim 13, wherein the communication method further comprises:
in response to receiving a 200OK response message for an Initial INVITE request message including SDP answer data,
in a case where no SDP answer data has been returned to the originating-side network, transmitting a 200OK response message for an Initial INVITE request message including the SDP answer data included in the 200OK response message in the originating-side early dialog, and
in a case where SDP answer data has been returned to the originating-side network, comparing the SDP answer data included in the 200OK response message with SDP data last transmitted to or received from the originating-side network,
in a case where there is a difference between the SDP answer data included in the 200OK response message and the SDP data last transmitted to or received from the originating-side network, (i) generating SDP offer data to be transmitted to the originating-side network from the SDP answer data included in the 200OK response message, (ii) transmitting an UPDATE request message including the generated SDP offer data in the originating-side early dialog, and then (iii) transmitting a 200OK response message for the Initial INVITE request message in the originating-side early dialog, and
in a case where there is no difference between the SDP answer data included in the 200OK response message and the SDP data last transmitted to or received from the originating-side network, transmitting a 200OK response message for an Initial INVITE request message that does not include SDP data in the originating-side early dialog.

18. The non-transitory computer readable medium according to claim 13, wherein the communication method further comprises:
in response to receiving a 200OK response message for an Initial INVITE request message that does not include SDP answer data, comparing SDP answer data last transmitted or received with SDP data last transmitted to or received from the originating-side network in a dialog in which the 200OK response message has been received, and
in a case where there is a difference between the SDP answer data included in the 200OK response message and the SDP data last transmitted to or received from the originating-side network, (i) generating SDP offer data to be transmitted to the originating-side network from the SDP answer data last transmitted or received in the dialog in which the 200OK response message has been received, (ii) transmitting an UPDATE request message including the generated SDP offer data in the originating-side early dialog, and then (iii) transmitting a 200OK response message for the Initial INVITE request message in the originating-side early dialog, or in a case where there is no difference between the SDP answer data included in the 200OK response message and the SDP data last transmitted to or received from the originating-side network, transmitting a 200OK response message for the Initial INVITE request message that does not include SDP data in the originating-side early dialog.

* * * * *